(12) United States Patent
Tschiegg et al.

(10) Patent No.: US 7,536,405 B2
(45) Date of Patent: May 19, 2009

(54) RISK MANAGEMENT INFORMATION INTERFACE SYSTEM AND ASSOCIATED METHODS

(75) Inventors: Mark A. Tschiegg, Granby, CT (US); Linda P. Burrows, Tolland, CT (US); Todd A. Reinart, Rancho Santa Margarita, CA (US); Peter F. Langan, Avon, CT (US); Michael J. Sutherland, Hartford, CT (US)

(73) Assignee: Global Asset Protection Services, LLC, Avon, CT (US)

( * ) Notice: Subject to any disclaimer, the term of this patent is extended or adjusted under 35 U.S.C. 154(b) by 990 days.

(21) Appl. No.: 10/085,497

(22) Filed: Feb. 26, 2002

(65) Prior Publication Data

US 2003/0160818 A1 Aug. 28, 2003

(51) Int. Cl.
*G06F 17/30* (2006.01)
(52) U.S. Cl. ............................ 707/102; 707/9; 705/38; 715/741
(58) Field of Classification Search .................. 707/102, 707/9–10, 200, 104.1, 100; 705/7, 38, 44, 705/1; 715/743, 741, 7, 752, 753
See application file for complete search history.

(56) References Cited

U.S. PATENT DOCUMENTS

| | | | |
|---|---|---|---|
| 5,852,819 A | 12/1998 | Beller | |
| 6,005,560 A * | 12/1999 | Gill et al. ................. | 715/500.1 |
| 6,023,694 A | 2/2000 | Kouchi et al. | |
| 6,026,397 A | 2/2000 | Sheppard ...................... | 707/5 |
| 6,366,299 B1 | 4/2002 | Lanning et al. ............. | 715/738 |
| 6,473,080 B1 | 10/2002 | Brown et al. ................. | 345/419 |
| 6,631,382 B1 | 10/2003 | Kouchi et al. | |
| 6,754,874 B1 | 6/2004 | Richman | |

(Continued)

FOREIGN PATENT DOCUMENTS

EP 1209851 5/2002

OTHER PUBLICATIONS

Selections from Web Risk Management website, including homepage page, Web Risk Manager™ Modules page, Web Risk Manager News page, and attached brochure, [online] [retrieved on Feb. 3, 2005], [retrieved from the Internet at URL: <http://www.webriskmanagement.com/home.asp>, 8 pages total.

(Continued)

*Primary Examiner*—Greta L Robinson
(74) *Attorney, Agent, or Firm*—Lee & Hayes, PLLC

(57) ABSTRACT

A graphical and interactive interface system manages risk management information. A secure database stores risk management information that is accessible by authorized access through a network. A graphics interface generates graphic data of the risk management information in response to the authorized access. One or more workflow process terminals connect in network with the database to provide updates to the risk management information. The graphics interface may provide one or more filter functions to manipulate the risk management information for display of graphic data at a computer networked with the graphics interface. The graphic data may include one or more graphical reports. Email may be automatically generated in response to updates to the risk management information. The database may respond to electronically received recommendations regarding a segment of risk management to post the recommendations with the segment of risk management information.

38 Claims, 33 Drawing Sheets

U.S. PATENT DOCUMENTS

| | | | |
|---|---|---|---|
| 6,785,728 B1* | 8/2004 | Schneider et al. | 709/229 |
| 2002/0087705 A1* | 7/2002 | Smyth | |
| 2002/0099586 A1* | 7/2002 | Bladen et al. | 705/7 |
| 2002/0133504 A1 | 9/2002 | Vlahos et al. | |
| 2002/0138318 A1 | 9/2002 | Ellis et al. | |
| 2002/0147671 A1 | 10/2002 | Sloan et al. | |
| 2002/0184068 A1* | 12/2002 | Krishnan et al. | |
| 2002/0198750 A1* | 12/2002 | Innes et al. | |
| 2003/0004967 A1 | 1/2003 | Calderaro et al. | |
| 2003/0014287 A1 | 1/2003 | Williams et al. | |
| 2003/0036087 A1 | 2/2003 | Kaushikkar et al. | |
| 2003/0037063 A1* | 2/2003 | Schwartz | 707/104.1 |
| 2003/0065613 A1* | 4/2003 | Smith | 705/38 |
| 2003/0112234 A1 | 6/2003 | Brown et al. | 345/419 |
| 2003/0120589 A1 | 6/2003 | Williams et al. | |
| 2003/0135554 A1* | 7/2003 | Bellotti et al. | 709/206 |
| 2003/0160818 A1 | 8/2003 | Tschiegg et al. | |
| 2003/0182180 A1 | 9/2003 | Zarrow | |
| 2003/0191780 A1 | 10/2003 | Heger et al. | |
| 2003/0229509 A1 | 12/2003 | Hall et al. | |
| 2004/0015422 A1* | 1/2004 | Glick et al. | 705/34 |
| 2005/0021288 A1 | 1/2005 | Kunce | 709/179 |
| 2005/0086096 A1 | 4/2005 | Bryant | |
| 2005/0192963 A1 | 9/2005 | Tschiegg et al. | |

OTHER PUBLICATIONS

U.S. Appl. No. 10/411,912, filed Apr. 12, 2003, entitled "Risk Management Information Interface System and Associated Methods."

U.S. Appl. No. 10/815,099, filed Mar. 30, 2004, entitled "Strategies for Managing Recommendations."

U.S. Appl. No. 60/372,291, filed Apr. 12, 2002, entitled "Risk Management Information Interface System and Associated Methods."

Beroggi, et al., "Operational Risk Management," IEMC '98 Proceedings, 1998, pp. 447-451.

* cited by examiner

FIG.3

| | Home | My Inbox | Analysis | Search | Refresh | Help | Feedback |

Create New Report | View My Report | Filter My Report

Choose a Saved Filter: [Choose ▼] [Delete]

Filtering Criteria

| Data Field | Condition 1 | Value 1 | Value 2 | |
|---|---|---|---|---|
| [Choose ▼] | [Choose ▼] | [Choose ▼] | [Choose ▼] | [Add/Modify] |

Selected Filtering Criteria

| Check to Clear/Modify | data Field | Condition 1 | Value 1 | Value 2 |
|---|---|---|---|---|
| O | Country | = | China | |
| O | Sprinkler Protection | = | Poor | |

[Apply Filter] [Save Filter] [Clear] [Clear all]

FIG.4

| ID# | Country | City | State | Address | Gross Site PD Values (000s USD$) | Occupancy | % Sprinklered | % Sprinklers Needed | Fire Department Type | Sprinkler Protection | Water Supply | Surveillance | Warehousing Protection | Other Protection |
|---|---|---|---|---|---|---|---|---|---|---|---|---|---|---|
| XXXXXX | XXXXXXX | XXXXXXXXX | XXX | XXXXX XXXXX XX | XXXX | Manufacturing | XXXXXX | XXXXX | XXXX | X | X | X | X | X |
| XXXXXX | XXXXXXX | XXXXXXXXX | XXX | XXXXX XXXXX XX | XXXX | Automotive | XXXXXX | XXXXX | XXXX | X | X | X | X | X |
| XXXXXX | XXXXXXX | XXXXXXXXX | XXX | XXXXX XXXXX XX | XXXX | Fabrication | XXXXXX | XXXXX | XXXX | X | X | X | X | X |

Risk Quality Ratings Data Fields

Location ID
Country
City
State
Address
Occupancy
Location Property Values (Gross)
Predominant Construction Type (match n/c demo)
Fire department Type
Sprinkler Protection
Water Supply
Surveillance
Warehousing Protection
Other Protection
Management Programs
Pre-Emergency Plan

FIG. 5A

Management Programs Data Fields

Location ID (6)/(Customer ID : 20)
Country (40)
City (50)
State (25)
Address (45+45+45)
Gross site Property Values
Impairments
Smoking Regulations
Maintenance
Employee Training
New Construction
Insurance Recommendations
Pre-Emergency Planning
Private Fire Brigade
Hazardous Materials
Hot Work
Loss Prevention Inspection
Surveillance
Fire Equipment Inspections
Hazard Evaluation
Housekeeping
Loss Prevention Inspection
Outside Contractors

Fire Protection Data Fields

Location ID
Country
City
State
Address
Occupancy
Gross Site Property Values
% Sprinklered (also known as AS%)
% Sprinklers Needed (also know as ASN%)
Fire Department Type (text - 20 char)
Sprinkler Rating (numeric) (cc)
Water Supply Rating (numeric) (cc)
Surveillance (numeric) (cc)
Warehousing (numeric) (cc)
Other Protection (numeric) (cc)

Fig. 5C

Construction Data Fields

Location ID
Country
City
State
Address
Occupancy
Gross Site Property Values
Property Values (US $/square foot)
Total Location Square Footage
Noncombustible Construction:
    Foot Squared (000)
    % Overall
Noncombustible Walls & Roof Deck with Combustible Roof Covering
    Foot Squared (000)
    % Overall
Combustible Roof and/ or Walls
    Foot Squared (000)
    % Overall

FIG. 5D

Recommendations Summary Data Fields

Location ID
Country
City
State
Address
Occupancy (200)
Gross Site Property Values
Recommendation Priority (>50)
Recommendation ID# (>9)
(Sub Item/Option) (joined with previous)
Status
Estimated Annual Risk Avoidance (000) (<10)
Estimated Cost To Complete (<10)
Type (>36)
Summary (link)
Customer Intent to Complete (>16)
Customer Comments (link)
Additional Fields:
Active Recommendations Completion Status
Active Recommendations by Type

FIG. 5E

**Loss Prevention Survey
Report Delivery
Loss Prevention Survey
Schedule
Data Fields**

Location ID
Country
City
State
Address
Occupancy
Gross Site Property Values
Field Servicing Office
Survey Frequency
Last survey
Last Survey: # Days to Delivery
Next Survey

FIG. 5F

CATASTROPHE
Data Fields

Location ID
Division
Country
City
State
Address
Occupancy

Gross Site Propert Values
Last Survey
ATC Earthquake Zone (1-7)
FEMA Flood Zone (or equivalent)
Wind Exposure

FIG. 5G

RISK MANAGEMENT INFORMATION INTERFACE SYSTEM AND ASSOCIATED METHODS

BACKGROUND OF THE INVENTION

Companies purchase risk management services to assess risks and exposures within relevant globally distributed properties to better assess and manage property protection and other investments, including human resources and business processes. Risk management services may include, for example, strategic planning and consulting, risk identification, loss prevention assessment and analysis surveys, and capital project review and management. Source data is generally collected from the purchasing company's locations, people, and processes by an extended team of globally distributed field associates, who issue evaluations and recommendations to correct property protection deficiencies; these recommendations and evaluations are generated based on consulting judgment. The source data is refreshed at each consulting engagement or at each field associate visit or via other communications. Typically, such services generate static reports for the companies; the companies, in turn, must sift through lengthy, obscure third-party evaluations of their loss control efforts and physical protection systems in order to benefit from the reports. The reading, maintenance and administration of these reports, and the management of resulting action items, is both time consuming and difficult, effectively devaluing associated investments in property protection, human resources and business processes. Moreover, many companies physically re-enter certain data from the reports into company-owned databases so as to facilitate local manipulation of data.

The invention seeks to advance the state of the art by a providing a seamless interface for real-time manipulation and management of risk management information over a network. Several other features of the invention are apparent within the description that follows.

SUMMARY OF THE INVENTION

In one aspect, the invention provides a graphical and interactive interface system for managing risk management information. A secure database stores risk management information that is accessible by authorized access through a network. A graphics interface generates graphic data of the risk management information in response to the authorized access. User inputs to the graphics interface regarding the risk management information may provide the authorized access.

In another aspect, one or more workflow process terminals connect in network with the database to provide updates to the risk management information. The terminals may for example include a computer, facsimile, telephone and scanner.

In yet another aspect, the database may include assistance data that is accessible concurrently with authorized access of the risk management information. The assistance data may for example include loss prevention and control standards and guidelines.

In yet another aspect, a first segment of the risk management information is associated with a first company having proprietary interest in the first segment, and a second segment of the risk management information is associated with a second company having proprietary interest in the second segment. The database and interface cooperate to provide access by the first company to the first segment by authorized access while prohibiting access by the second company to the first segment. Similarly, the database and interface cooperate to provide access by the second company to the second segment by authorized access while prohibiting access by the first company to the second segment. Accordingly, in another aspect, the risk management information is segmented within the database for association with a plurality of companies having proprietary interest in, and authorized access to, one or more segments of the risk management information.

In one aspect, at least part of the risk management information is encrypted in complying with the authorized access. One or more access computers coupled in network with the graphics interface thus access the risk management information of the database by decrypting the encrypted risk management information with input of appropriate access codes.

In yet another aspect, the workflow engine, security database, and e-mail notification engine cooperate to automatically generate an e-mail when new information is posted to the risk management database. Users with authorized access to view the segment of the risk management database to which the new information has been posted receive the 'e-mail notification' if the user requests and self-authorizes such e-mail notification. The user may turn this function on or off at their own discretion via a standard screen within the graphic interface. The user may also change the frequency of e-mail notification at their own discretion via the same screen.

In yet another aspect, the graphics interface provides one or more filter functions to manipulate the risk management information for display of graphic data at a computer networked with the graphics interface. The filter functions may for example provide user selection of one or more of the following: country, city, state, location identifier, gross site property damage values, property value, total location in square feet, percent noncombustible construction, percent of noncombustible walls and roof deck with combustible roof covering, percent of combustible roof, percent of combustible walls, percent with sprinklers, percent needing sprinklers, survey report delivery time, estimated annual risk avoidance, cost to complete, last survey date, next survey year/month due, ATC earthquake zone, sprinkler protection, water supply, surveillance, warehousing protection, other protection, management programs, impairments, smoking regulations, maintenance, employee training, new construction, insurance, pre-emergency planning, private fire brigade, hazardous materials, hot work, loss prevention inspection, fire protection inspection, hazard evaluation, housekeeping, outside contractors, FEMA flood zones, windstorm, fire department type, survey frequency, priority, status, customer intent to complete, and predominant construction.

Moreover, the graphic data may include one or more graphical reports such as a fire protection, recommendation summary, loss prevention survey report delivery, loss prevention survey report schedule, risk quality benchmarking, risk quality rating, management programs, building construction, catastrophe, active recommendations, and completion status. Additional risk analysis reports may for example include loss estimate, location summary, recommendation status, recommendation cost-benefit analysis, and water test results.

In one aspect, the graphics interface and database form a web server platform to generate secure web pages of the risk management information at a computer networked with the platform and with authorized access to the risk management information.

In certain aspects, email is generated in response to updates to the risk management information. For example the database or an email notification application may generate the email in response to authorized updates to a segment of risk management information. The email is addressed to a user at an access terminal that has the appropriate authorizations. The email may contain a hyperlink to the updated information and/or to a document loaded in association with the segment. Email may also be generated periodically to inform the user of interim updates.

In another aspect, the database responds to inputs by a user with authorized access, at a computer networked with the database, to securely store electronic documents with the risk management information associated with the user. These electronic documents may for example include one or more of loss prevention survey results, risk summaries, and CAD diagrams. Software may convert the CAD diagrams into a format more suitable for the database. One format is a graphical format. The software may reside with the database or with a workflow application networked with the database.

The database may for example be a SQL database server. The database of one aspect responds to electronically received recommendations regarding a segment of risk management information to post the recommendations with the segment of risk management information.

In another aspect, the graphics interface accommodates input of interactive recommendations such that the recommendations may be stored with the database in association with the segment of risk management information.

One system of the invention includes software and interconnectivity for generating email indicating, to authorized users, updates to risk management information. The system may further provide these users with options to turn email notification on or off and/or to self-select email notification frequency.

In another aspect, the graphics interface provides drill-down linkage between high level summaries and low level explanatory details based upon contributing factors to one or more ratings. The graphics interface may further generate color-coded graphic data to differentiate decision-making risk management information. The color-coded graphic data may further associate different colors to different quality ratings.

One system of the invention provides for appending user-generated comments to one or more segments of the risk management information. Another system of the invention provides for viewing and manipulating recommendations and associated valuations through the graphics interface and over the network. Another system of the invention provides for selectively switching between cost-benefit analyses, summaries, and status screens, through the graphics interface and over the network. Yet another system of the invention provides for selectively switching between values associated with recommendations, through the graphics interface and over the network.

In certain aspects, one system of the invention generates one or more of the following recommended cost-benefit analysis information through the graphics interface and over the network: total loss before implementation of a recommendation, total loss after implementation of a recommendation, property damage loss before implementation of a recommendation, property damage loss after implementation of a recommendation, business interruption loss before implementation of a recommendation, business interruption loss after implementation of a recommendation, estimated cost to complete, estimated cost to complete source, estimated probability, estimated probability source, and estimated annual risk avoidance. The estimated annual risk avoidance may for example include a factor of [(property loss before implementation of a recommendation+business interruption loss before implementation of a recommendation)−(property loss after implementation of a recommendation+business interruption loss after implementation of a recommendation)]/probability (in years)).

In another aspect, recommendations may be shared between users through the interface and over the network. By way of example, the recommendations may be shared based upon access and authority levels of accounts, divisions, locations, or individuals.

One system of the invention provides for posting user-generated documents with user-authorized risk management information through the graphics interface and over the network. Another system of the invention provides for automatically emailing users with notification of modifications in a segment of risk management information, so long as the users have authorized access to the segment. By way of example, the modifications may include the posting of a new document to the segment of risk management information. New documents may be user-created, or generated by a third-party and posted by an authorized user.

In another aspect, an email server connects in network with one or more access computers. An email notification application connects in network with the database to automatically send email notification(s) to the access computers upon updates to segment(s) of the risk management information. A workflow engine application may also connect in network between the database and the email notification application, to interface between one or more access terminals and the database.

In one aspect, the invention provides a system for managing risk management information such that an authorized user may access graphical data representing at least part of the segment of risk management information. A database stores one or more segments of risk management information. The system augments the information within one of the segments through a workflow process terminal in network with the database. An email notification server and/or application provide for communicating email to an authorized user of the one segment to notify the authorized user of the augmented information. A workflow engine application may further interface between one or more workflow process terminals and the database. A security buffer may further couple in network between the database and an access computer of the authorized user to ensure only authorized access to the segments of information. The email may include an Internet link to the augmented information within the one segment. The buffer may automatically check with the database to ensure that a user accessing the link has authorized access to the augmented information. The system may include a graphics interface to collate risk management information from the database into a graphical display for an access computer coupled in network with the database.

In yet another aspect, a method is provided for managing risk management information, including the steps of: segmenting risk management information within a database according to access authorizations; generating graphical display of a segment of risk management information at an access computer networked with the database in response to user inputs at the computer and having appropriate access authorizations; updating the segment of risk management information in response to data inputs through a workflow process terminal; and automatically communicating email to the access computer in notification of the data inputs to the segment.

In one aspect, the step of automatically communicating includes the step of sending an Internet link to information within the segment. In another aspect, the method includes the step of automatically verifying authorizations at the database in response to user interaction with the Internet link. The step of generating graphical display may include the step of filtering the segment of risk management information in response to user-selected filtering options at the access computer.

The invention is next described further in connection with certain embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which:

FIG. 2, FIG. 3, FIG. 4 illustrate representative reports and data filtering functions that may be processed with the system of FIG. 1;

FIGS. 5A, 5B, 5C, 5D, 5E, 5F, 5G and FIGS. 6-26 collectively illustrate a flow chart linking data elements, graphic display screens and system components suitable for use and operation with system of FIG. 1;

DETAILED DESCRIPTION OF THE DRAWINGS

Figure 1:
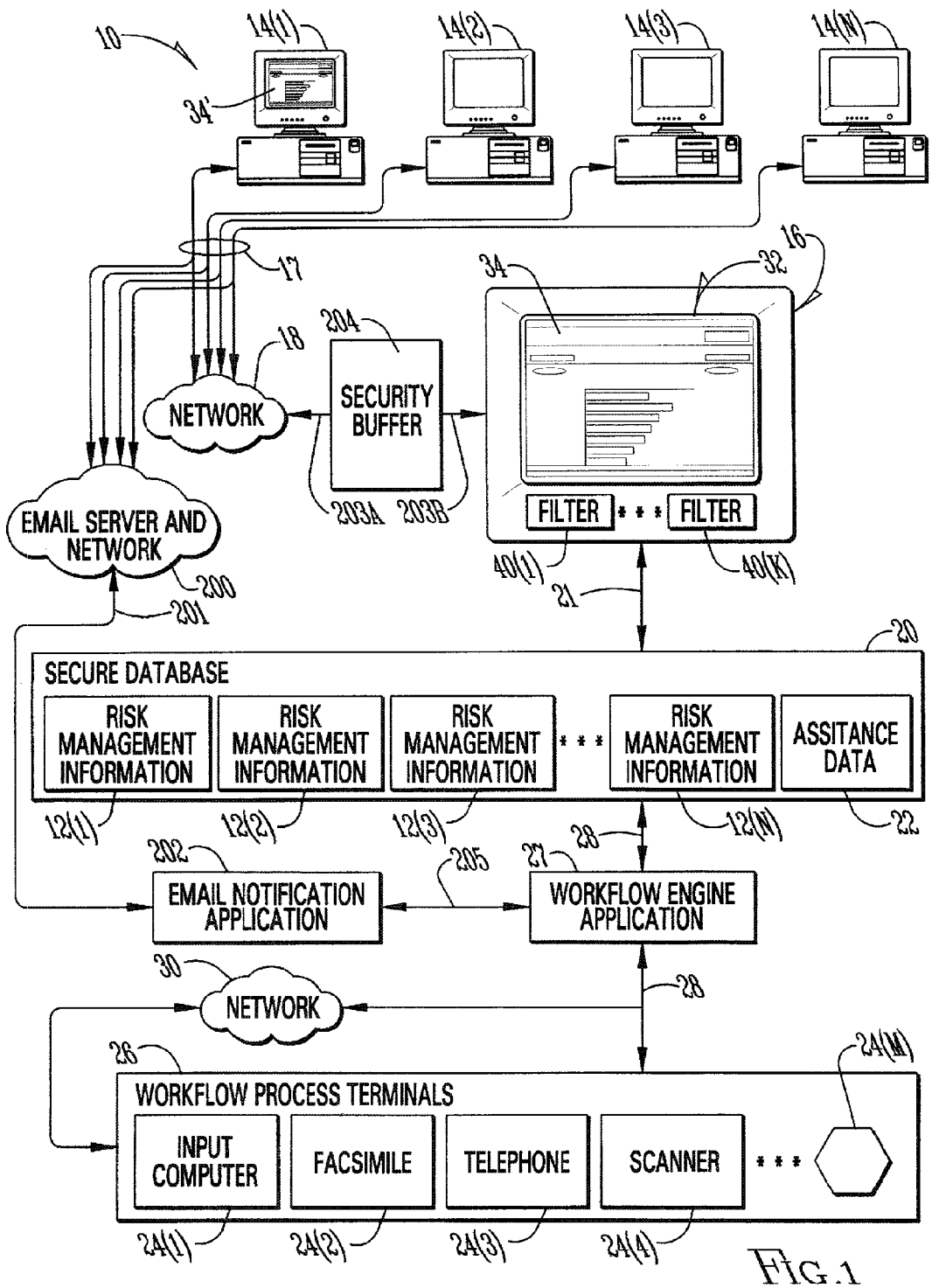
FIG. 1 shows a schematic block diagram of one risk management interface system of the invention.

FIG. 1 shows one risk management system 10 of the invention. System 10 delivers, archives and manages risk management information 12 for users at access computers 14 via a seamless graphics interface 16. Computers 14 connect to interface 16 through one or more buses 17 and/or a network 18, such as the Internet. Risk management information 12 is illustratively stored within a secure database 20, connected to graphics interface 16 by a bus 21. Computers 14 access information 12 only with appropriate access authorization, and typically that authorization provides access to only a portion of information 12 within database 20; FIG. 1 thus shows information 12 as a plurality of secure segments 12(1), 12(2), 12(3) ... 12(N) illustrating that a particular segment 12() may by accessed by only authorized users at one or more computers 14. By way of example, a user at computer 14(1) may access and manipulate risk management information segment 12(1), a user at computer 14(2) may access and manipulate risk information segment 12(2), and so on; at the same time, system 10 may restrict computer 14(1) from access to risk information segments 12(2), 12(3) ... 12(N), restrict computer 14(2) from access to risk information segments 12(1), 12(3) ... (12(N), and so on.

Typically, access to each secure segment 12() is restricted to one company that has a proprietary interest in the risk information data associated with that portion of information 12. Companies may however choose to make the information and connection available to other interested parties, outside of the facility owner's company, at their choice and discretion. Examples of the extended access may include other service providers, insurance companies, insurance brokers, vendors, contractors, and the like. As described below, once access is granted between one access computer 14 and an associated segment 12(), a user may manipulate the data within that segment so as to isolate desired detail, prioritize activities and/or make risk quality assessments.

Those skilled in the art should appreciate that system 10 typically recognizes users at access computers 14, and not the physical computers. That is, system 10 recognizes authorized users who log in at any computer 14 with an appropriate user name and password.

Database 20 may further store assistance data 22 for access by users at computers 14, to facilitate risk assessments in conjunction with review and manipulation of risk management information 12. Data 22 may for example include loss prevention and control standards and guidelines.

Database 20 couples with workflow process terminals 24 illustratively grouped into a workflow process terminals section 26. Section 26 and database 20 serve to aggregate data by collaborative workflow processes to present that data at interface 16, accessible by authorized access at a computer 14. More particularly, a terminal 24 is interactive with database 20 so as to electronically communicate input from the terminal 24 to a designated risk information segment 12(). This communication may for example occur through a bus connection 28 and/or network 30, such as the Internet. By way of example, an input computer 24(1) may download comments and/or computer aided design (CAD) drawings relevant for risk management information segment 12(2) of database 20. In another example, a facsimile may be transmitted to a risk management information segment 12(N) via facsimile 24(2). In still another example, telephone or voice comments may be appended to information of a designated segment 12(1) through a telephone 24(3). In yet another example, a CAD drawing may be scanned into database 20 for association with a particular secure segment 12(3) via scanner 24(4). Those skilled in the art should appreciate that other data may be input to database 20 by other electronic means 24(M) as a workflow process terminal, to associate relevant data to an appropriate risk management information segment 12(), as above.

In one embodiment, system 10 includes a workflow engine application 27 to securely communicate by and between secure database 20 and terminals 26. Workflow engine application 27 archives and incorporates updated information, including a user's view of website information provided by interface 16 and database 20. Accordingly, when a user interacts with system 10 by making a change to certain interface fields, data is updated in database 20 for transmission to remotely located persons (e.g., at terminals 24) who may review the report.

System 10 may thus control and associate inputs from any of terminals 24 to any of risk management information segments 12(). In one embodiment of the invention, system 10 communicates email to an appropriate computer 14 indicating that a terminal 24 has input data to its associated risk management information segment 12(). By way of example, a company with a proprietary interest in risk management information segment 12(1) may wish to be notified immediately, through one of its employees at a computer 14(3), of updated information to risk management information segment 12(1) by a terminal 24. In such an example, system 10 may send email notification to that employee when terminal 24 updates information of segment 12(1). System 10 may also generate similar email notifications on a periodic basis, e.g., monthly, weekly or daily, to summarize newly posted information within a segment 12(). In one embodiment, an email notification to a computer 14 includes a hyperlink to information within a segment 12(); for example, a new document posted to the segment 12() may be accessed immediately by interactively clicking the hyperlink via computer 14 receiving the email. Through graphical interface 16, a user may thus self-select or change the e-mail notification period, turning it on or off, or changing the frequency of delivery (e.g., daily, weekly, or monthly).

As appropriate, terminals 24 may also receive information from database 20, interface 16 and/or computers 14. In one example, a user at a computer 14 may request retransmission of items of data loaded into a particular risk management information segment 12() by email communicated to a person at a terminal 24.

Communications between users at access computers 14 and workflow process terminals 24 may thus occur in near real-time, via graphics interface 16. When data input by a terminal 24 is associated with a particular risk management information segment 12(), an authorized user at a computer 14 may view the risk management data of that segment 12(), including the latest data input by a terminal 24, via a graphic display 32. Illustratively, display 32 shows graphic data 34 that may for example be viewable by one computer 14 accessing data within a particular segment 12(). Graphic data 34 may represent the very latest digital data associated with a particular segment 12(), including the most recent risk information input by terminals 24. In one embodiment, graphics interface 16 provides a web-based interface generating a local web page graphic 34' for the authorized computer 14, illustratively shown with access computer 14(1). Accordingly, users of system 10, at access computers 14, have up-to-date and hands-on access to sensitive risk management information 12 for their company.

Those skilled in the art should appreciate that graphics interface 16 and database 20 may for example be constructed as a single web server platform to generate secure web graphics 34' as the graphical interface and data communications portal between computers 14 and risk management information 12. In one embodiment, database 20 is a SQL (structured query language) database server known in the art.

System 10 also provides for storing critical documents within risk management information segments 12(), for access by authorized computers 14. By way of example, a company with unique access to proprietary risk management information segment 12(1) may access that data through computer 14(1); that company may also download and store company critical documents to segment 12(1), such as loss prevention survey results, risk summaries, CAD diagrams, and more. A download to segment 12() may occur through a computer 14 or via an appropriate terminal 24. Once again, database 20 is "secure" so that only a company with authorized access, at a computer 14 or terminal 24, may view graphic data 34 and manipulate risk management information of its associated risk management information segment 12(). Typically, access to a particular segment 12() is protected through encryption techniques, such as 128-bit SSL encryption, to ensure "eyes only" access to appropriate company proprietary information 12 within database 20.

In one embodiment, workflow engine application 27 comprises software for converting CAD diagrams to a graphic image that may be saved within a segment 12() of database 20.

Display of graphic data 34 may also be manipulated by a user, with authorized access, at a computer 14. Graphic data 34 may be structured or viewed in a way selected by the user at computer 14. Graphic data 34 may for example be manipulated into a variety of risk management information reports selectable through graphics interface 16, via a computer 14, including benchmarking, outstanding recommendation summaries, and management program evaluations. Representative reports that may be generated by system 10 through interaction with interface 16 may for example include:
Fire protection
Recommendation summary
Loss prevention survey report delivery
Loss prevention survey report schedule
Risk quality benchmarking
Risk quality rating
Management programs
Building construction
Catastrophe
Active recommendations
Completion status Interface 16 is responsive to inputs at computers 14 to generate the reports or desired graphic data 34 derived from the appropriate risk management information segment 12(). Interface 16 further responds to user inputs at computers 14 to generate tables and graphs to compare a company's facilities to outstanding recommendations associated with risk management information 12.

In one embodiment of the invention, users may interactively filter data from their respective risk management information segments 12() by selecting one or more risk management filters 40 of graphics interface 16. FIG. 1 illustratively shows an array of filters 40(1) ... 40(K). Filters 40 manipulate data of risk management information 12 for display to users at computers 14; for example one filter 40(1) may be used to generate graphic 34 at computer 14(1). A user of system 10 may save configurations of filters 40 so that, for example, only that user can view and utilize the saved filter; or so that a filter 40 may be seen and utilized by anyone with access to a particular information segment 12(). Moreover, a user may define a filter 40 and save the filter with his associated risk management information segment 12() so as to later use the filter in other sessions. Representative filters 40 for use in system 10 may for example exhibit the following non-limiting properties:
Filters 40 are preferentially available to the most active data fields
Filters 40 may operate on multiple data fields
Filters 40 support date ranges and user specified field values
Filters 40 utilize criteria carried forward to multiple reports
Filters 40 are accessible at all times
Filters 40 may be changed at any time
Filters 40 operate to de-clutter reports with inactive data fields
Filters may be saved or deleted
All filters 40 may be applied concurrently or individually
Filters may be common (shared and viewable by all) or personal (unique to a specific user)

Figure 2:
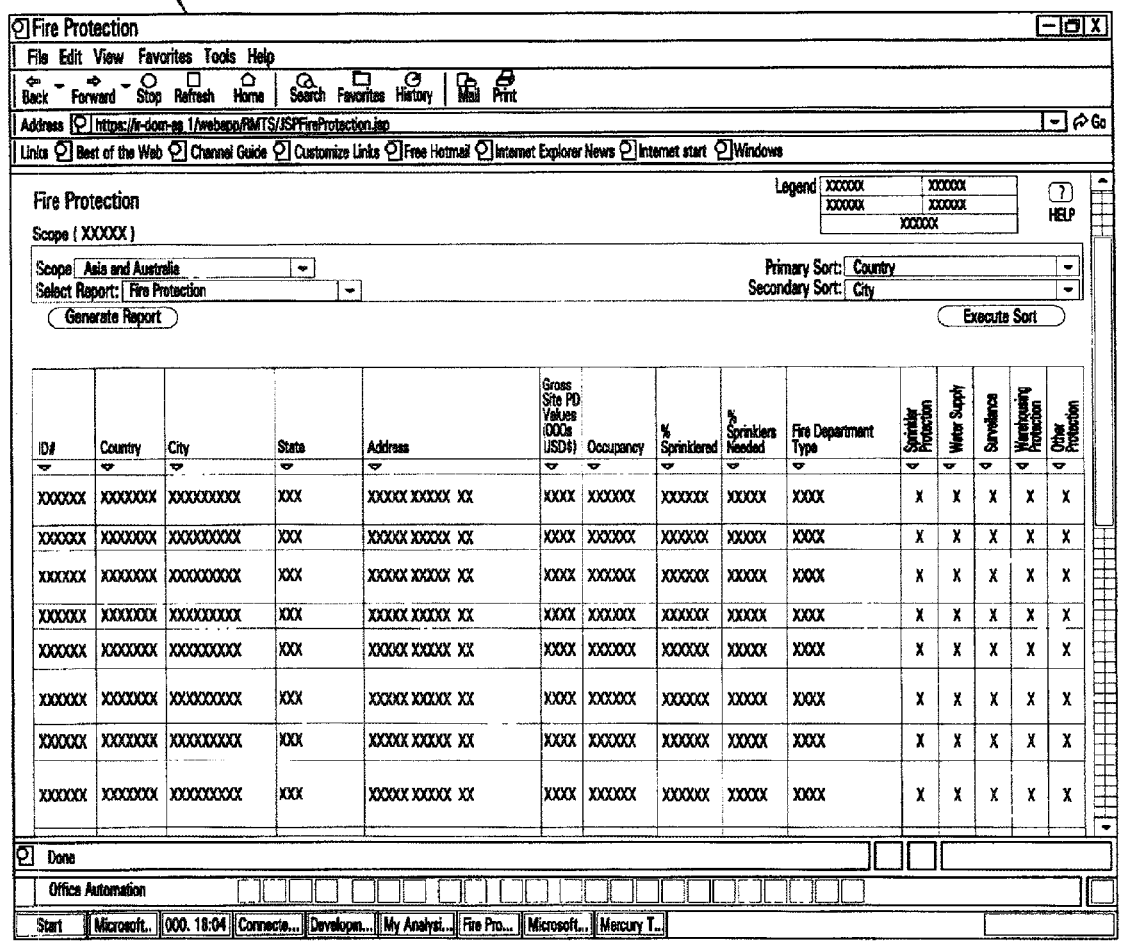
Figure 6:
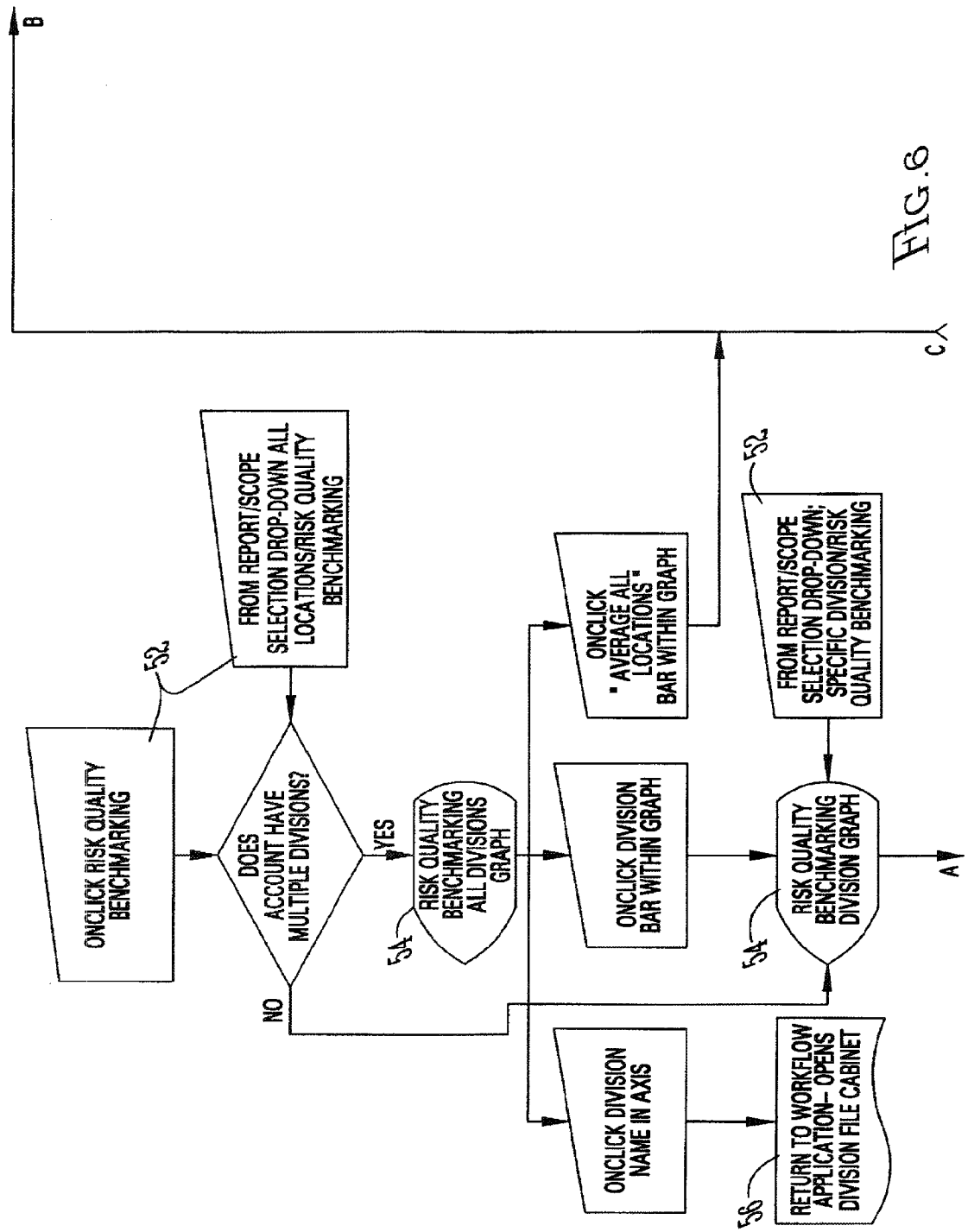
Figure 7:
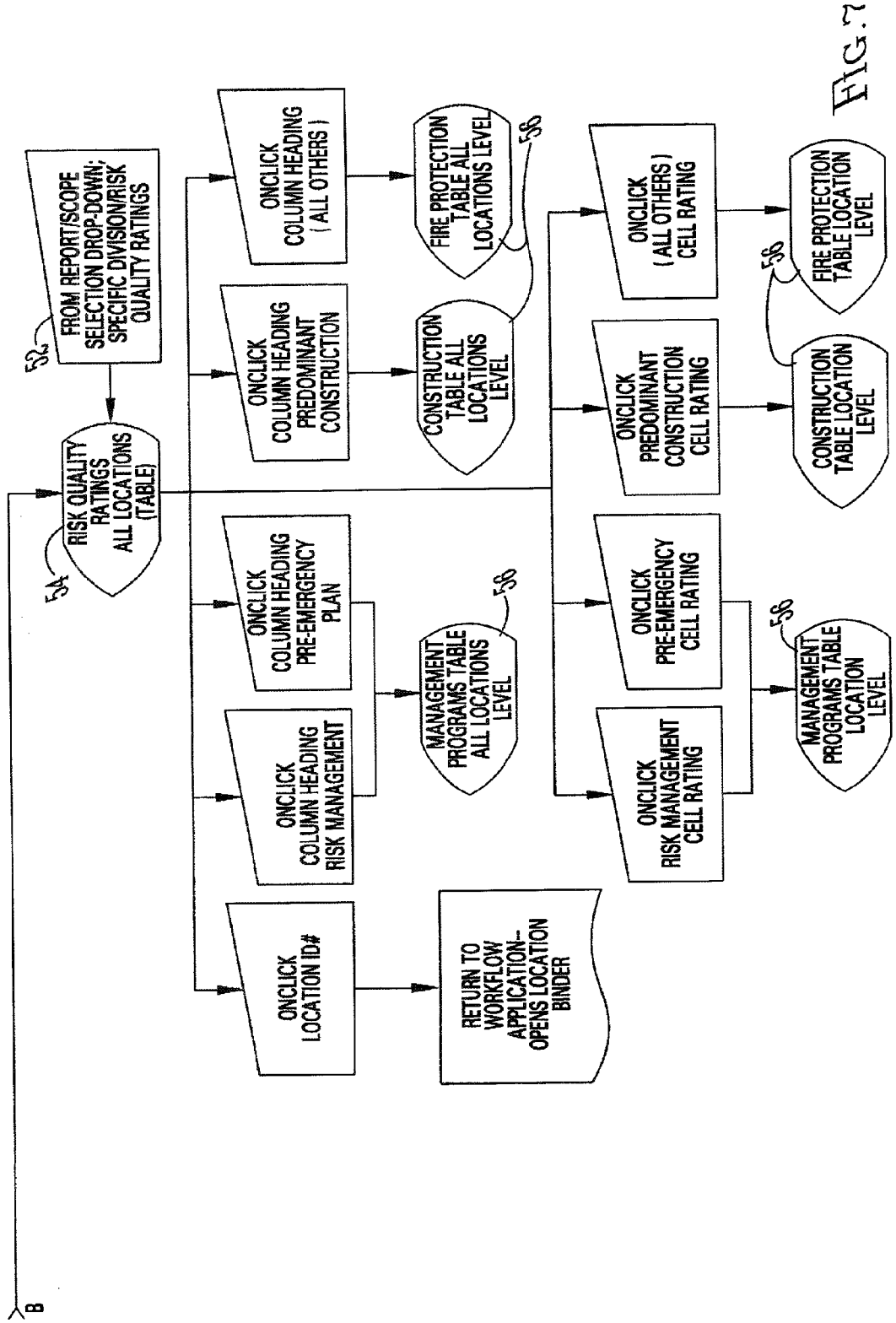
Figure 8:
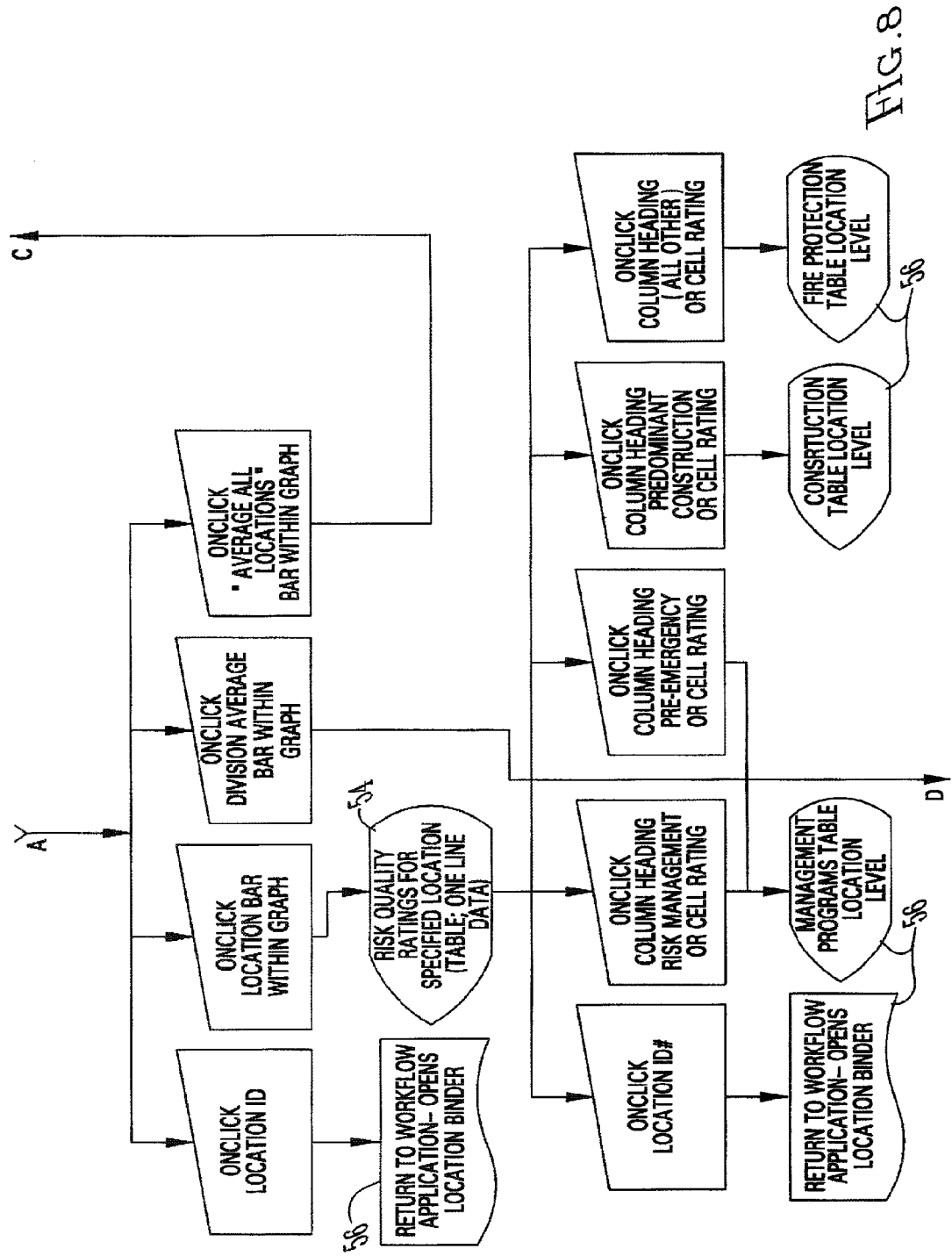
Figure 9:
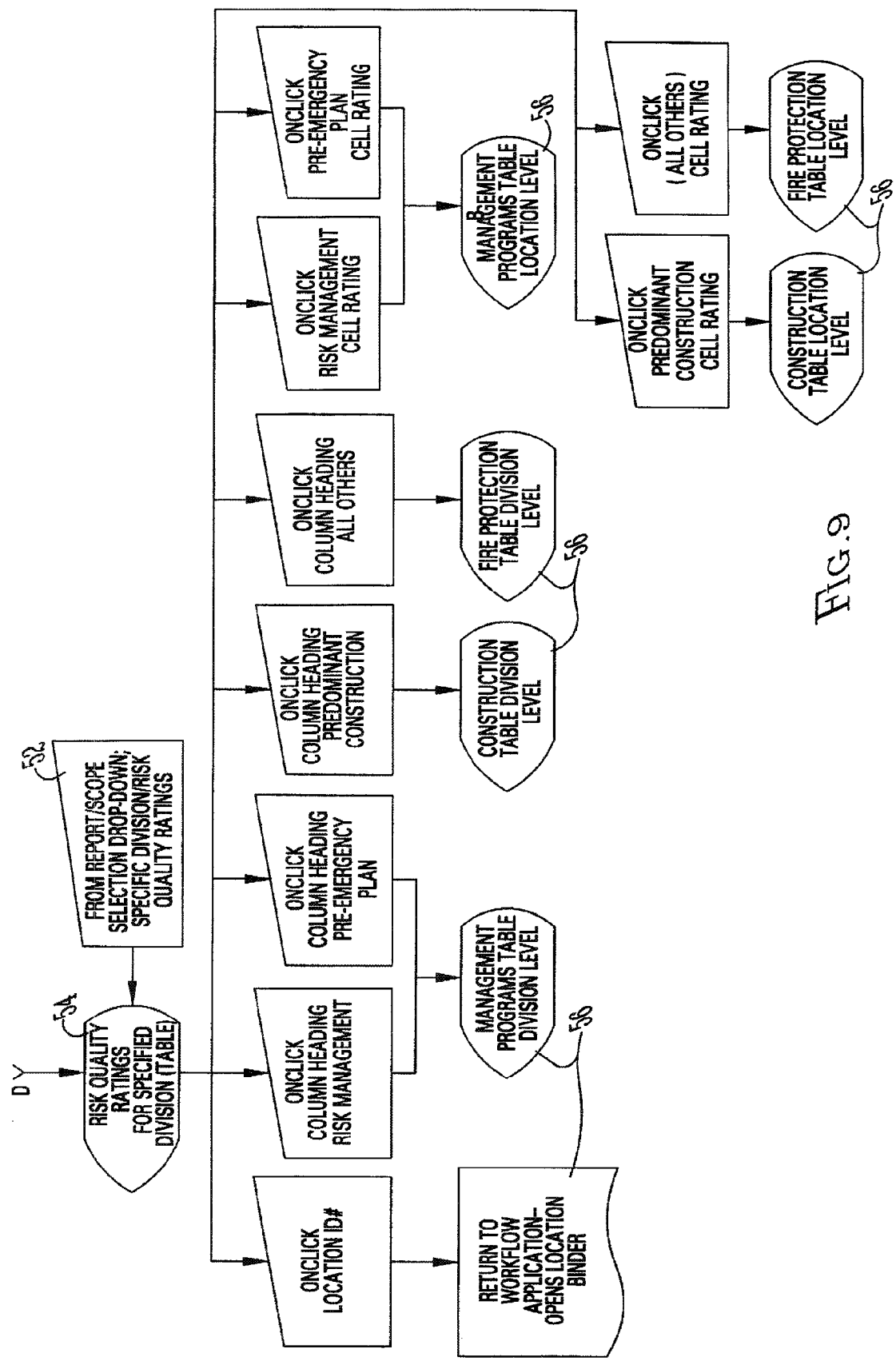

By way of a first example, FIG. 2 shows one representative data graphic 50 generated by and for a user at computer 14(1) and utilizing data from risk management information segment 12(2) through interaction with graphics interface 16. Graphic 50 shows a fire protection report with a scope of Asia and Australia. A filter 40 may be used to filter data of graphic 50. By way of example, FIG. 3 shows one interactive filter 52 available to computer 14(1) that serves to limit the region to China and also to locate "poor" sprinkler protection ratings. Once selected, the graphic data 34' available to the user may be a report 54, such as illustrated in FIG. 4.

The system of one embodiment provides for a variety of filtering options. By way of example, the following table is a non-limiting list of filters, and potential field values, based upon current data fields in use, that may be applied to certain reports generated with the system of FIG. 1:

| Current Data Fields Filtering Risk Management Information 12 | Interactive Display Fields at Graphics Interface 16 and/or Computer 14 |
|---|---|
| ☐ Country | Text Box enabling multiple entry of values separated by a delimiter |
| ☐ City | |
| ☐ State | |
| ☐ Location Identifier | |
| ☐ Property values | Number field |
| ☐ Total location in square feet | |
| ☐ Noncombustible construction, % overall | |
| ☐ Noncombustible walls and roof deck with combustible roof covering, % overall | |
| ☐ Combustible roof and/or walls, % overall | |
| ☐ % with sprinklers | |
| ☐ % needing sprinklers | |
| ☐ Survey report delivery time | |
| ☐ Estimated annual risk avoidance | |
| ☐ Cost to complete | |
| ☐ Last survey date | Selection via a popup window showing a calendar with month/day/year |
| ☐ Next survey year/month due | |
| ☐ ATC earthquake zone | Selectable list options: Excellent, Good, Fair, Poor and not-evaluated, enabling selection of multiple options |
| ☐ Sprinkler protection | |
| ☐ Water supply | |
| ☐ Surveillance | |
| ☐ Warehousing protection | |
| ☐ Other protection | |
| ☐ Management programs | |
| ☐ Impairments | |
| ☐ Smoking regulations | |
| ☐ Maintenance | |
| ☐ Employee training | |
| ☐ New construction | |
| ☐ Insurance | |
| ☐ Pre-emergency planning | |
| ☐ Private fire brigade | |
| ☐ Hazardous materials | |
| ☐ Hot work | |
| ☐ Loss prevention inspection | |
| ☐ Surveillance | |
| ☐ Fire protection inspection | |
| ☐ Hazard evaluation | |
| ☐ Housekeeping | |
| ☐ Outside contractors | |
| ☐ FEMA flood zones | Selectable list with 5 options: A, B, C, A&B, NE, enabling selection of any one |
| ☐ Windstorm | Selectable list with 5 options: L, M, H, H&M, NE, enabling selection of any one |

| Data Fields Filtering Risk Management Information 12 | Interactive Display Fields at Graphics Interface 16 and/or Computer 14 |
|---|---|
| ☐ Fire department type | Selectable list with 3 options: ☐ Public/Full Time ☐ Volunteer ☐ None enabling selection of any one |
| ☐ Survey frequency | Selectable list with options: 6, 12, 18, 24, 36, 0 (months) |
| ☐ Priority | Selectable list |
| ☐ Status | Selectable list with options: active, done/verified complete, abeyance under evaluation, delayed/on-hold, in-progress, and complete |
| ☐ Type | Selectable list options: Workplace safety Automatic sprinklers-supplement, improve, reinforce Special hazard protection Boiler machinery Automatic sprinklers-install Surveillance Water supply/manual suppression Construction/Exposure protection Management direction-implement, reinforce, supplement |
| ☐ Rec. ID # | Selectable list containing year of recommendations |
| ☐ Customer intent to complete | Selectable list with options: To Do (>3 years) To Do (<1 year) To Do (<=3 years) Considering No Plans |
| ☐ Predominant construction | Selectable list with options: Noncombustible-high fire resistance Noncombustible-moderate fire Resistance Combustible? Not Evaluated |

In one embodiment, system 10 of FIG. 1 provides for interactive recommendations. Users at computers 14 and/or terminal 24 may comment upon recommendations produced as a result of risk evaluations posted within a risk management information segment 12(). Additionally, users at computers 14 may set target dates, adjust status, and identify intent so as to better track the recommendation's actual progress towards completion. In another embodiment, system 10 is programmed to respond to new comments by sending an email to designated persons on the Internet who may have the need or desire to review the new comments; such persons access the risk management information 12, and comments, through a computer (e.g., a computer 14 and/or terminal 24(1)) with appropriate access authorizations. By way of example, these persons typically fall into the following categories: they are identified specifically by the commenting user at the time a comment is issued; they are identified by a user's manager as being responsible for the completion of the recommendation; or they represent all users who have access to view the recommendation.

FIGS. 5A, 5B, 5C, 5D, 5E, 5F, 5G and FIGS. 6-26 collectively illustrate a flow chart linking data elements, graphic display screens and system components suitable for use and operation with system 10 of FIG. 1. The linking between screens logically connect at entrance, exit and transfer points within the flow chart if these figures. Specifically, FIGS. 5A, 5B, 5C, 5D, 5E, 5F, 5G show data fields 50 used within the flow chart of FIGS. 6-26. FIGS. 6-26 illustrate how these data fields are used to obtain lower-level interactive information; these figures are thus denoted as "drill-down" specifications as interaction through respective elements provides the enhanced detailed information. By way of example, a user with appropriate authorizations at a computer 14 may interact with the drill-down specifications of FIGS. 6-26 to graphically generate display of desired risk management information associated with a particular segment 12(). In the context of FIGS. 5A, 5B, 5C, 5D, 5E, 5F, 5G and FIGS. 6-26, therefore, system 10 for example provides a workflow application and messaging platform for document hosting and email notification, data manipulation and decision support analysis.

Data field 50A, FIG. 5A, is specifically used within FIGS. 6-9 for reporting risk quality benchmarking and risk quality ratings. The drill-down specifications within FIGS. 6-9 start at initiation points 52; the "onclick" annotation indicates user selection may be achieved through computer button clicks or menu selections relative to graphical user interfaces (e.g., at a computer 14, FIG. 1). Each decision point 54 provides singular or multiple lower-level drill-down options, as shown. Control transfer, terminal and new data query points 56 provide the as-shown capability.

Figure 10:
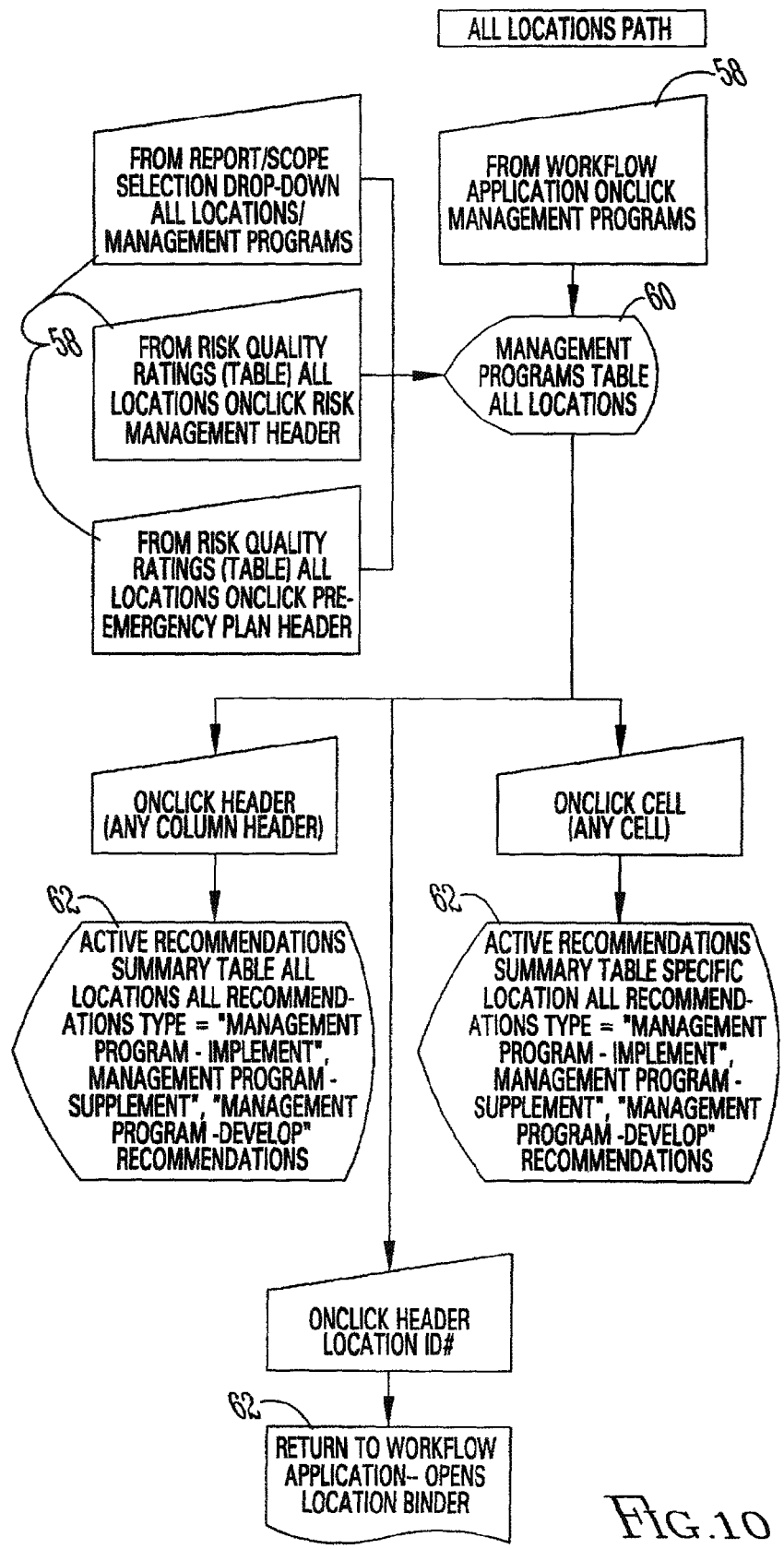
Figure 11:
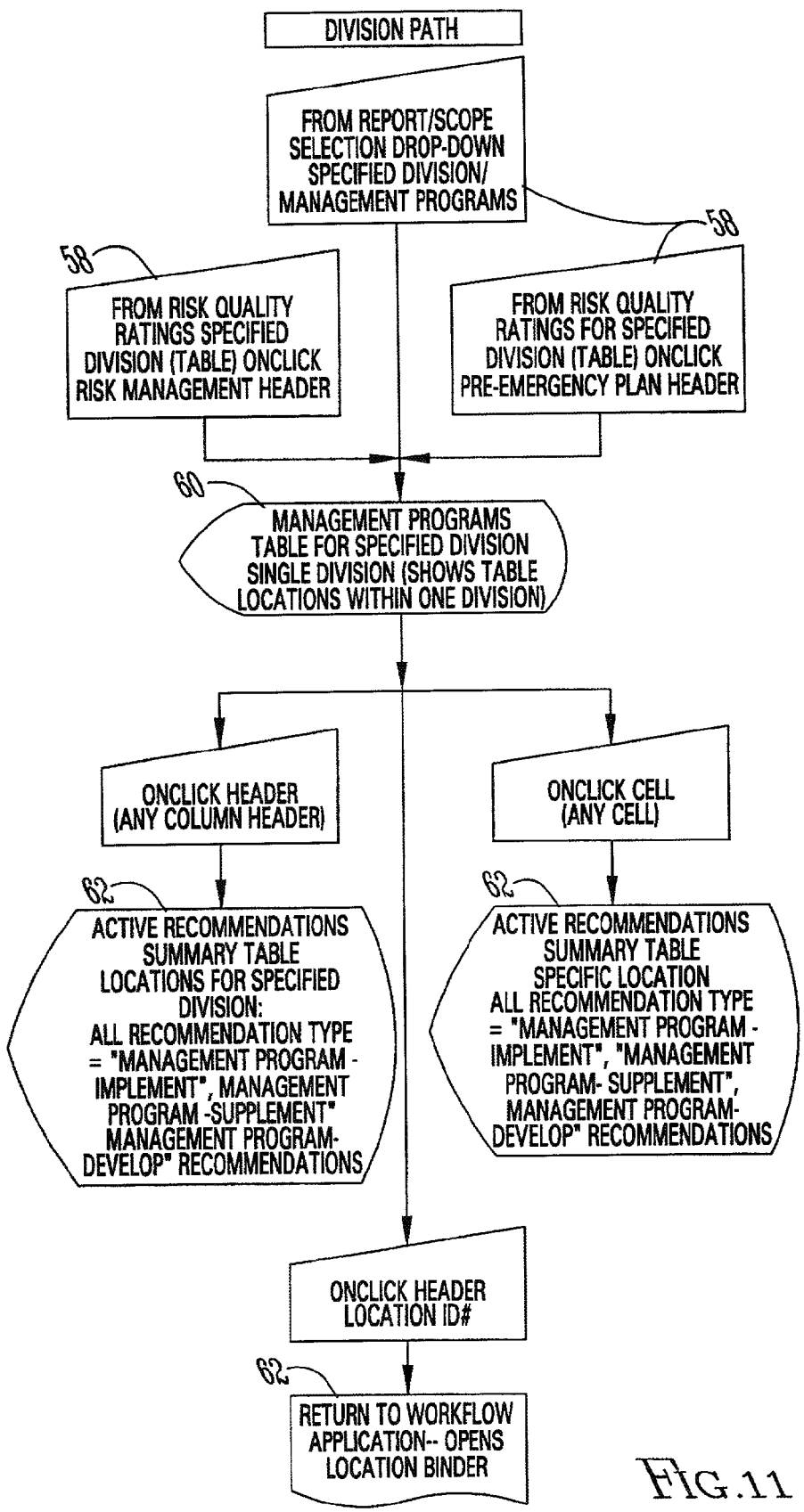
Figure 12:
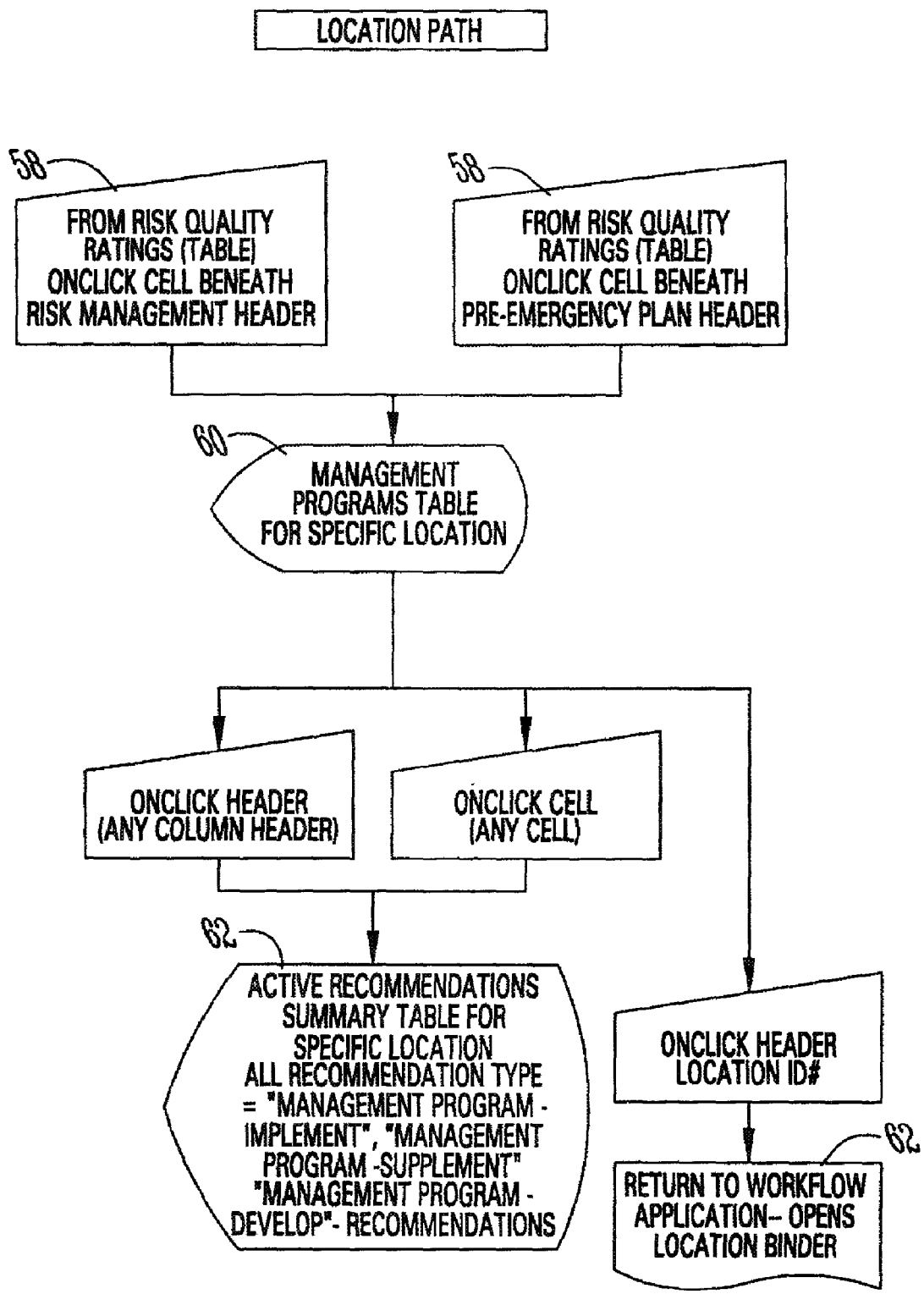

Data field 50B, FIG. 5B, is specifically used within FIGS. 10-12 for reporting management programs. The drill-down specifications within FIGS. 10-12 start at initiation points 58; the "onclick" annotation indicates user selection may be achieved through computer button clicks or menu selections relative to graphical user interfaces (e.g., at a computer 14, FIG. 1). Each decision point 60 provides singular or multiple lower-level drill-down options, as shown. Control transfer, terminal and new data query points 62 provide the as-shown capability. FIGS. 10-12 are annotated with three separate paths—all locations, division, and one location—to segregate corporate structures to the relevant information. By way of illustration, if a user clicks on the header "management programs," he receives a drill-down graphic view of management programs. If the user then clicks on the location with a poor rating for management, then he may receive a drill-down view of the recommendation and/or deficiencies that are causing a negative rating.

Figure 13:
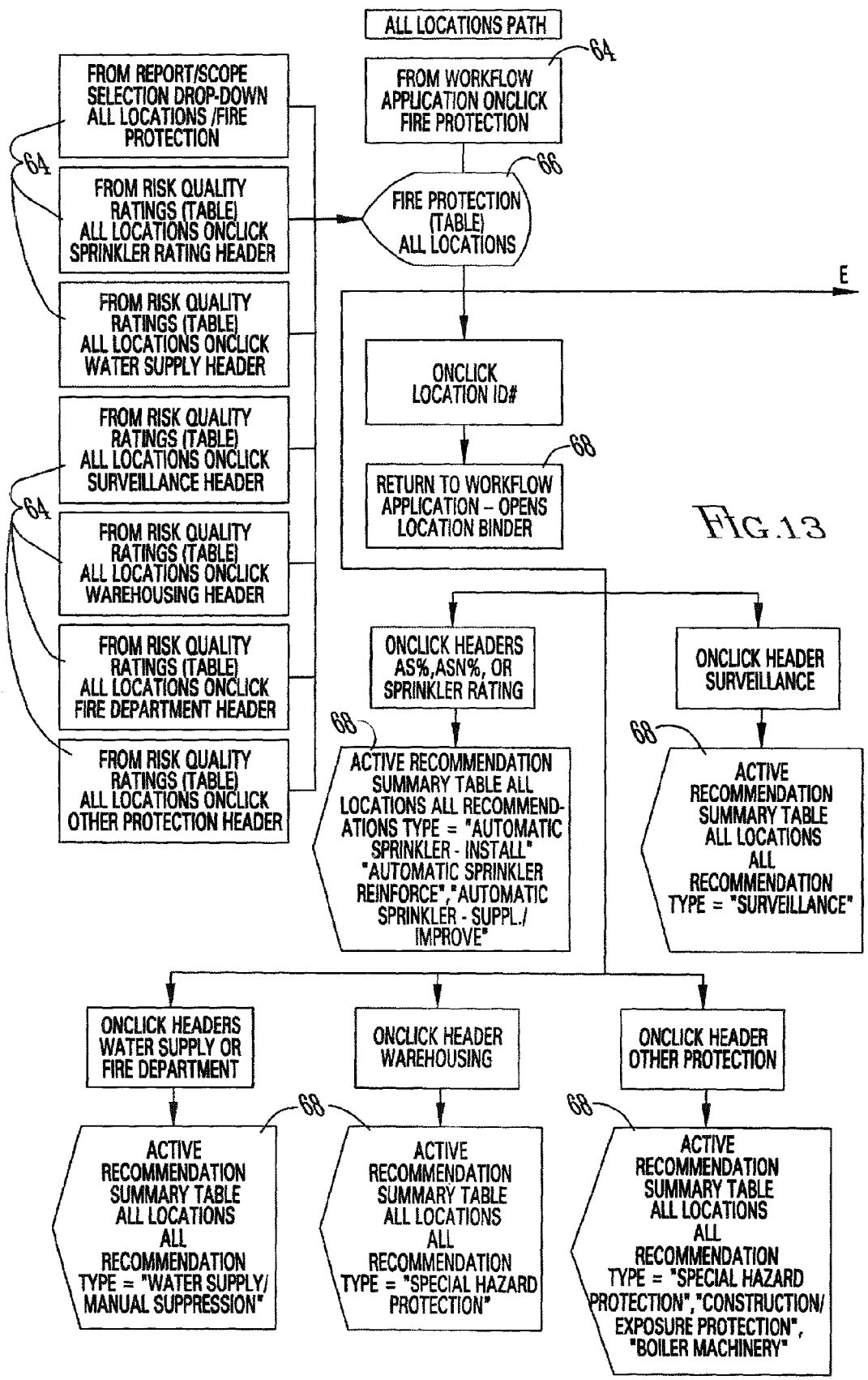
Figure 14:
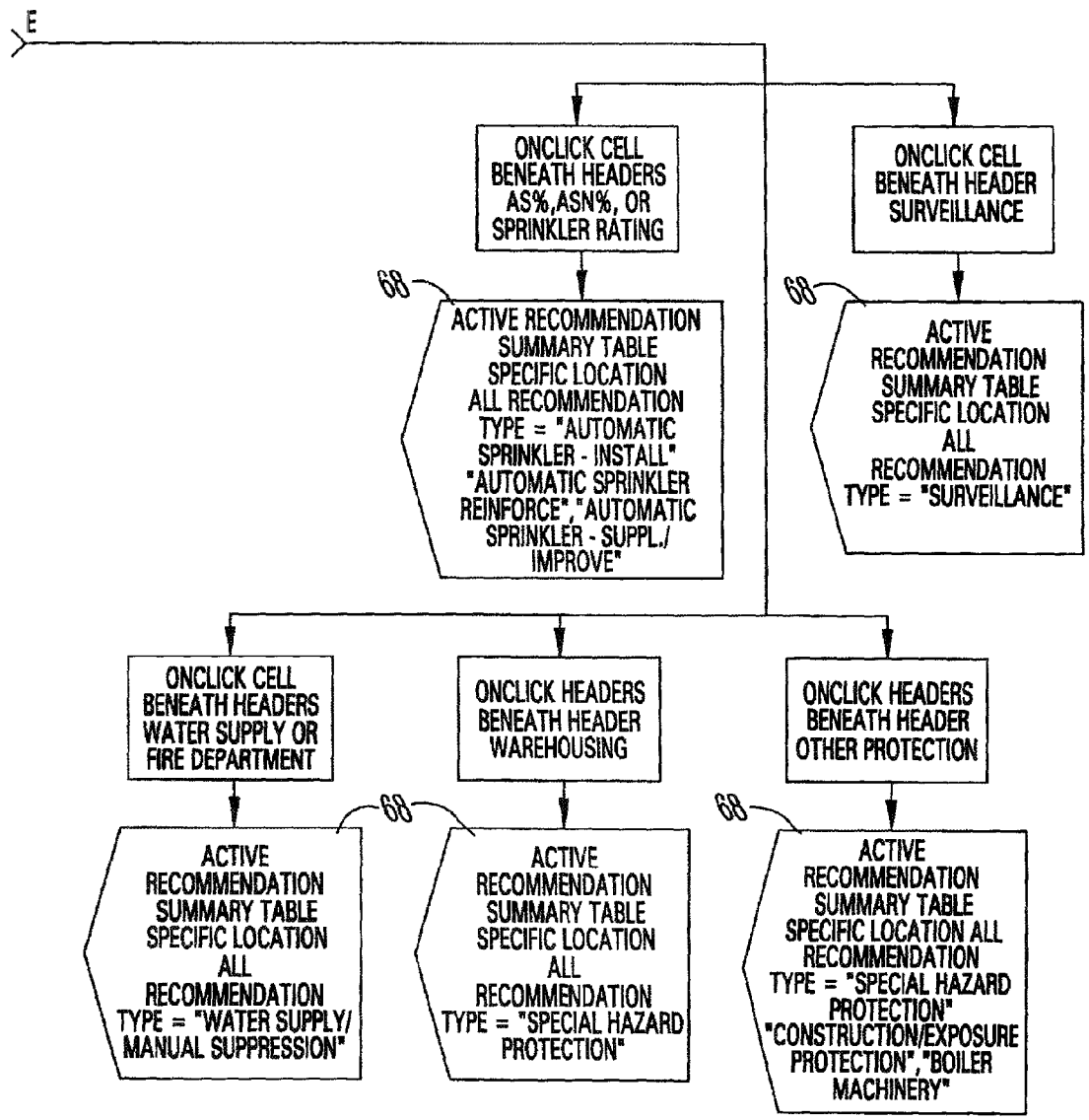
Figure 15:
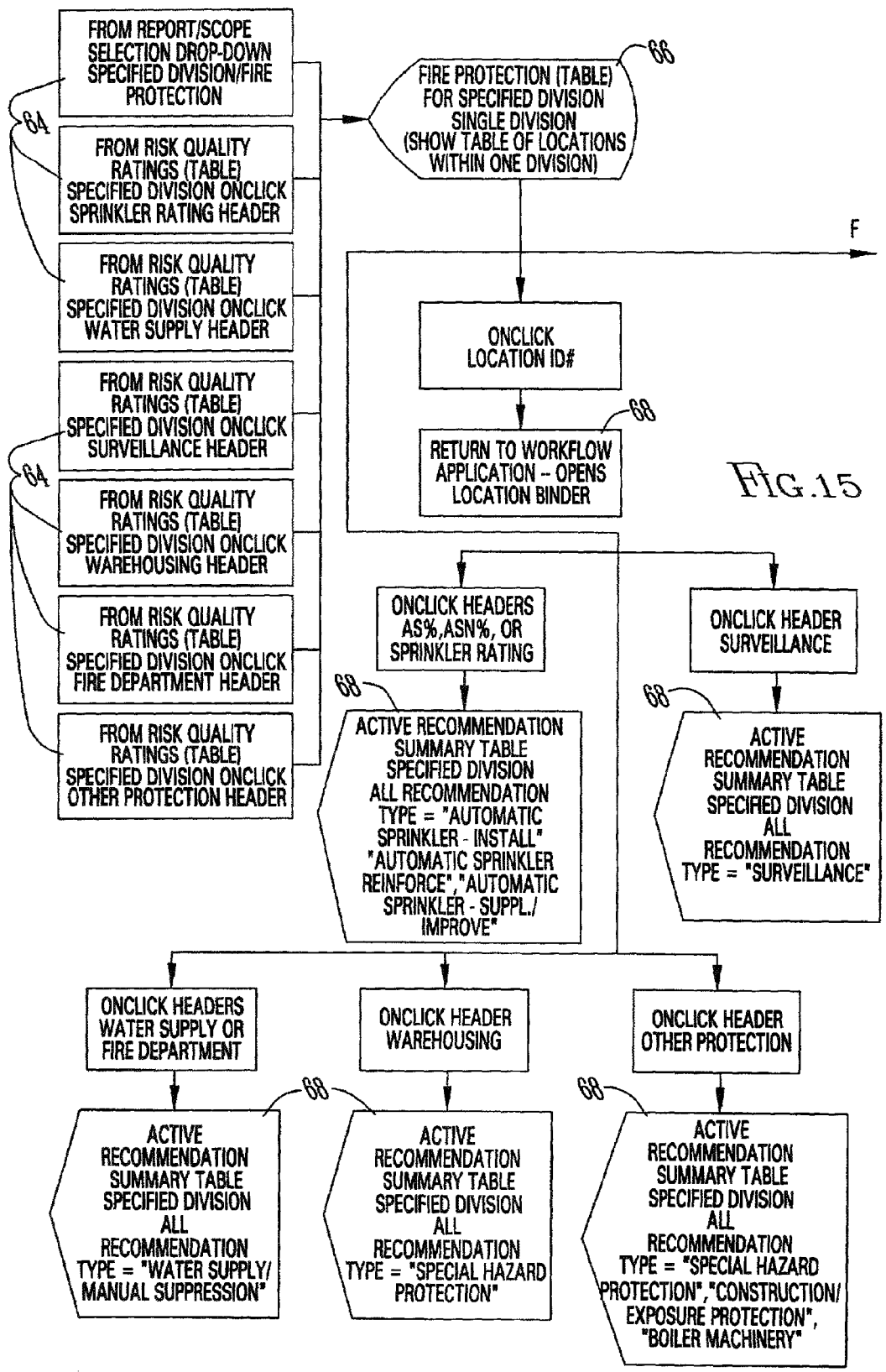
Figure 16:
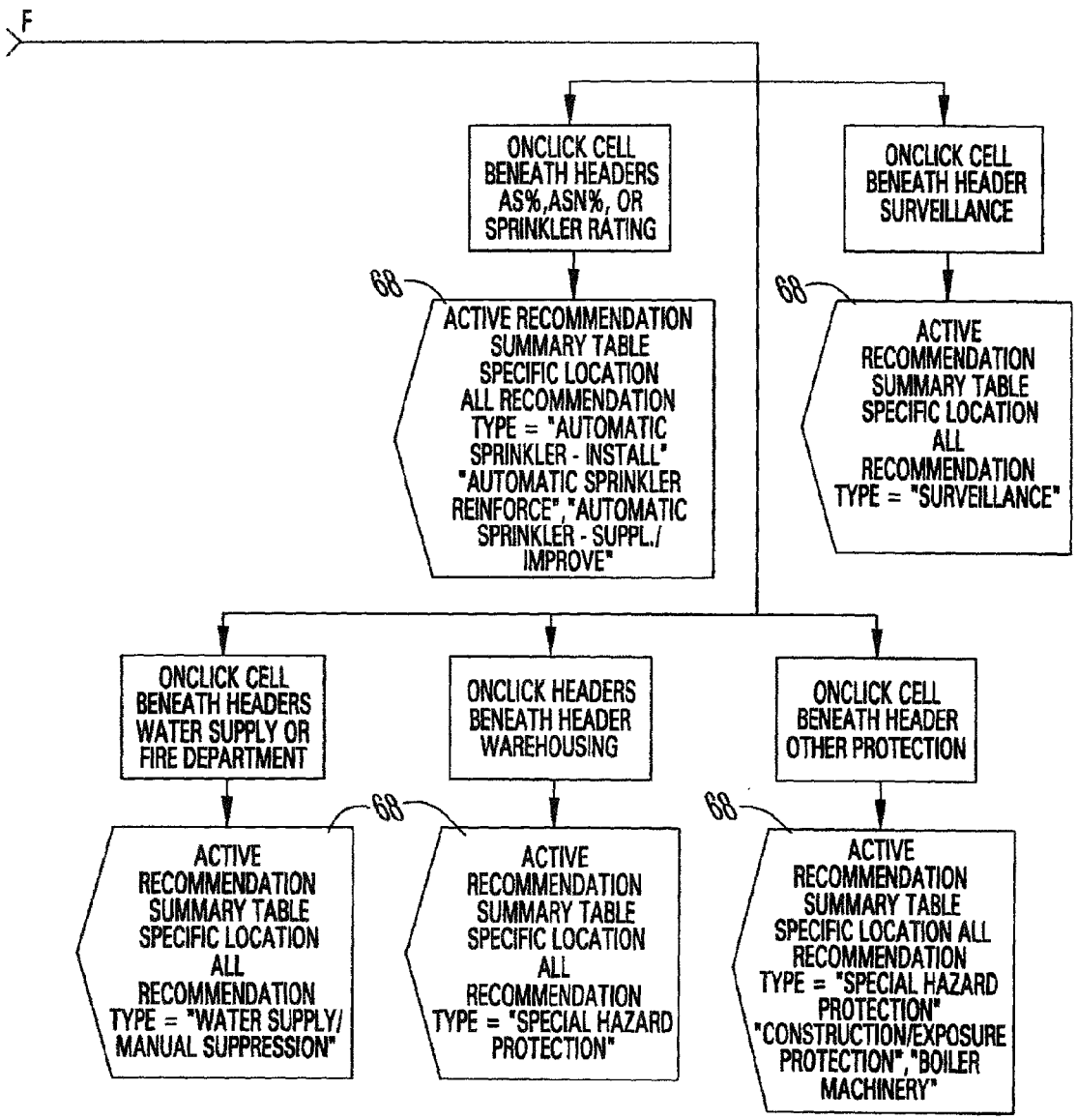
Figure 17:
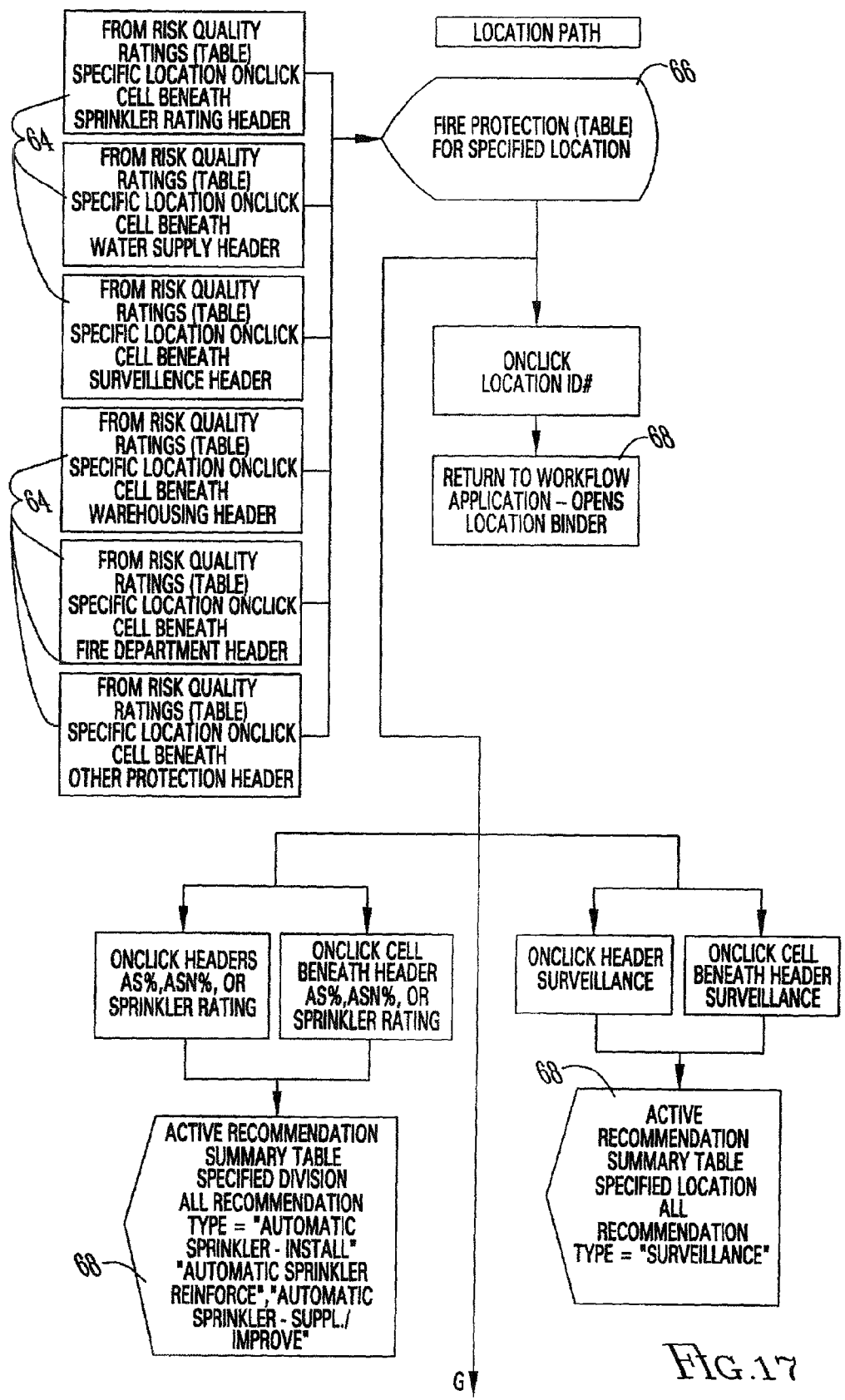
Figure 18:
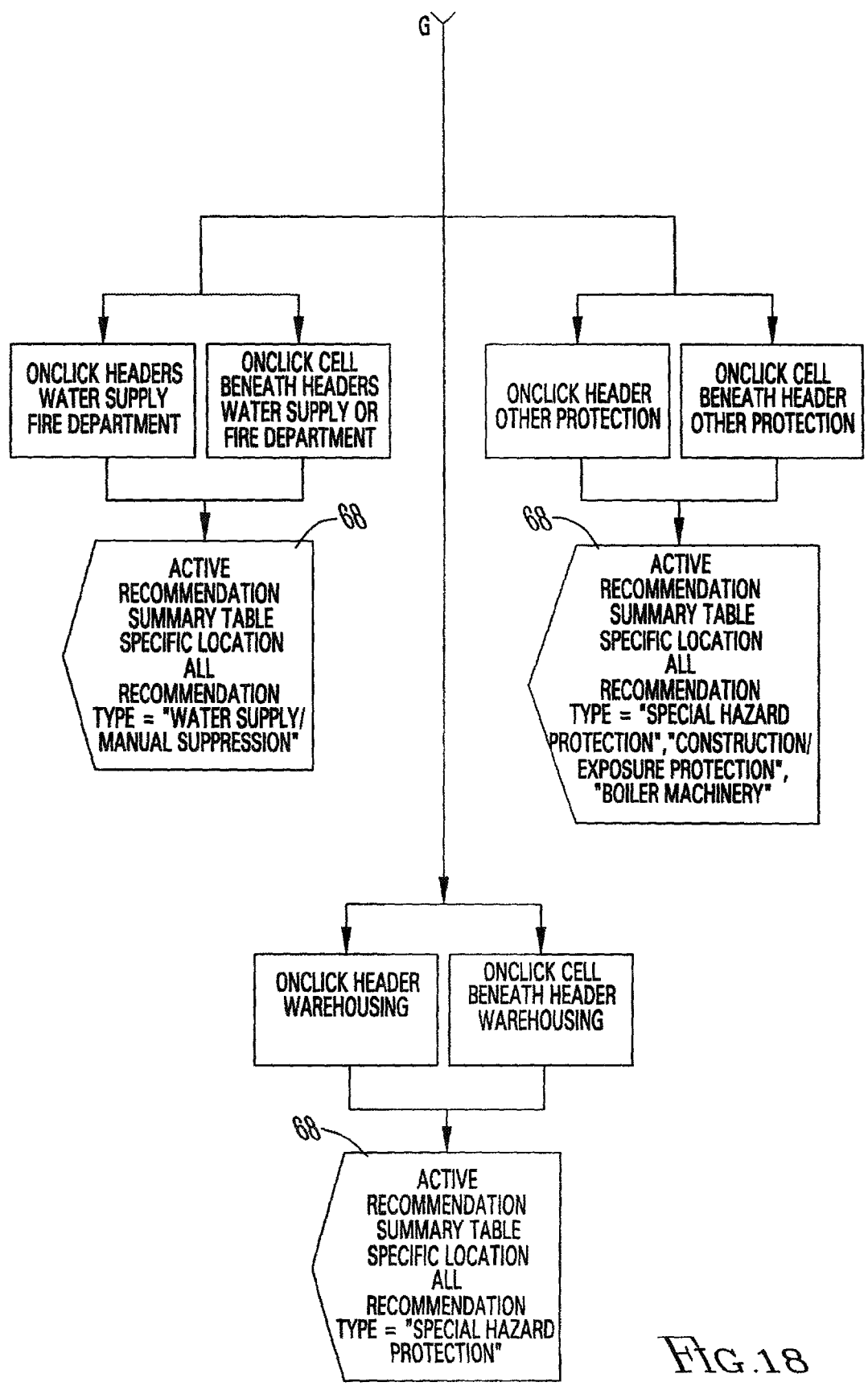

Data field 50C, FIG. 5C, is specifically used within FIGS. 13-18 for reporting fire protection programs. The drill-down specifications within FIGS. 13-18 start at initiation points 64; the "onclick" annotation indicates user selection may be achieved through computer button clicks or menu selections relative to graphical user interfaces (e.g., at a computer 14, FIG. 1). Each decision point 66 provides singular or multiple lower-level drill-down options, as shown. Control transfer, terminal and new data query points 68 provide the as-shown capability. FIGS. 13-14 provide fire protection drill-down specifications for the all locations path; FIGS. 15-16 provide fire protection drill-down specifications for the division path; and FIGS. 17-18 provide fire protection drill-down specifications for the specified location path.

Figure 19:
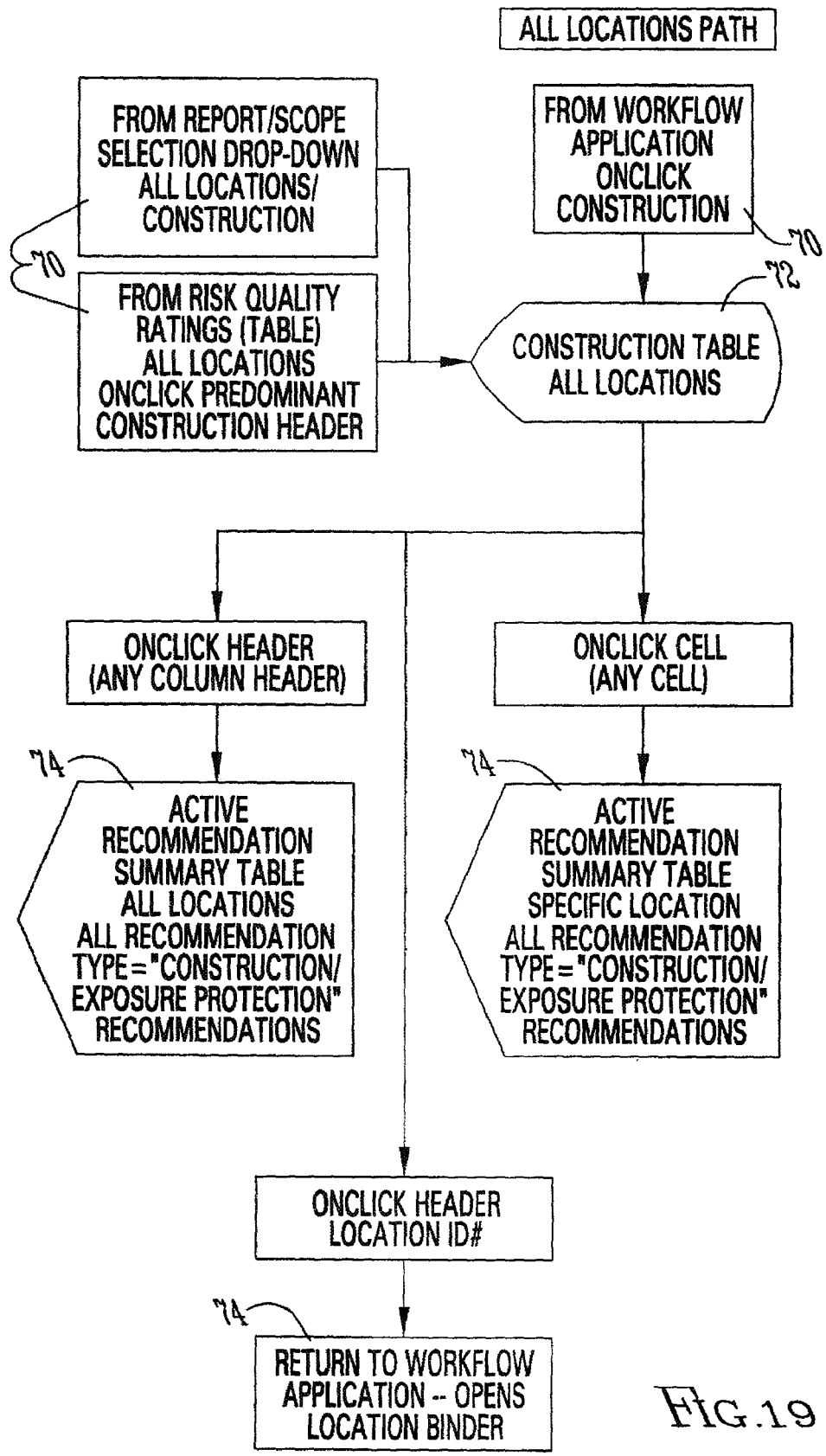
Figure 20:
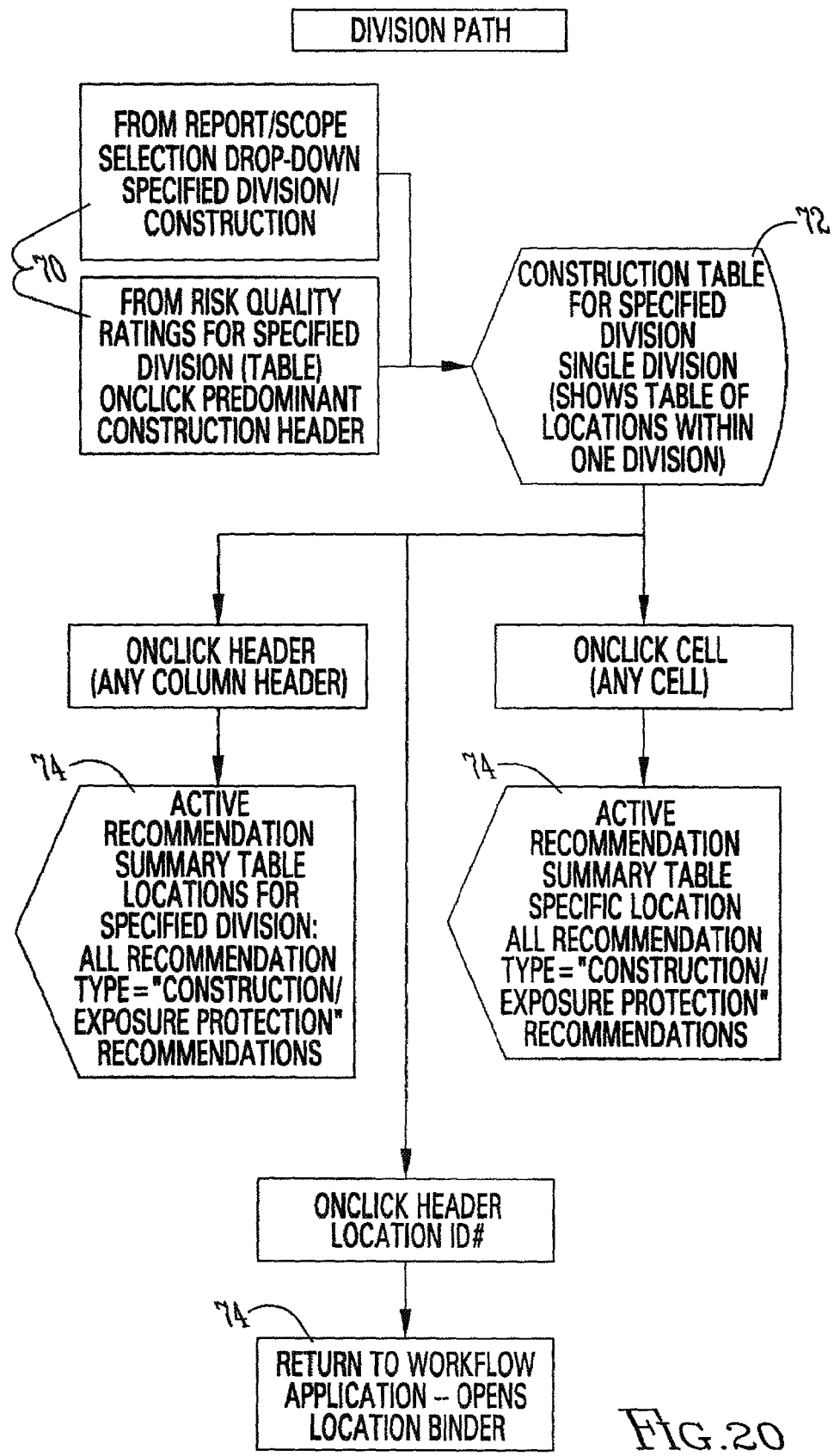
Figure 21:
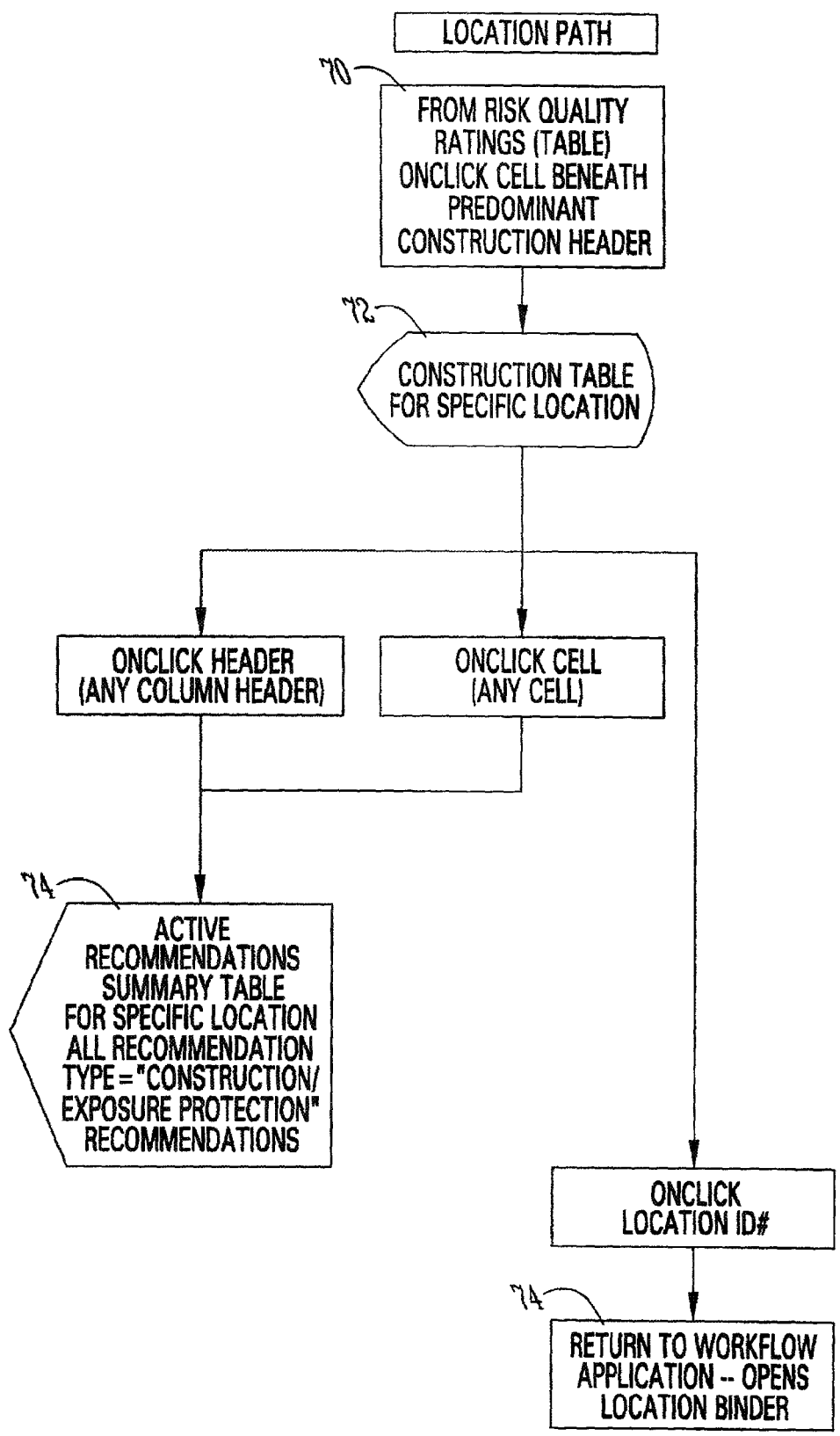

Data field 50D, FIG. 5D, is specifically used within FIGS. 19-21 for construction reporting. The drill-down specifications within FIGS. 19-21 start at initiation points 70; the "onclick" annotation indicates user selection may be achieved through computer button clicks or menu selections relative to graphical user interfaces (e.g., at a computer 14, FIG. 1). Each decision point 72 provides singular or multiple lower-level drill-down options, as shown. Control transfer, terminal and new data query points 74 provide the as-shown capability. FIGS. 19-21 are annotated with three separate paths—all locations, division, and one location—to segregate corporate structures to the relevant information.

Figure 22:
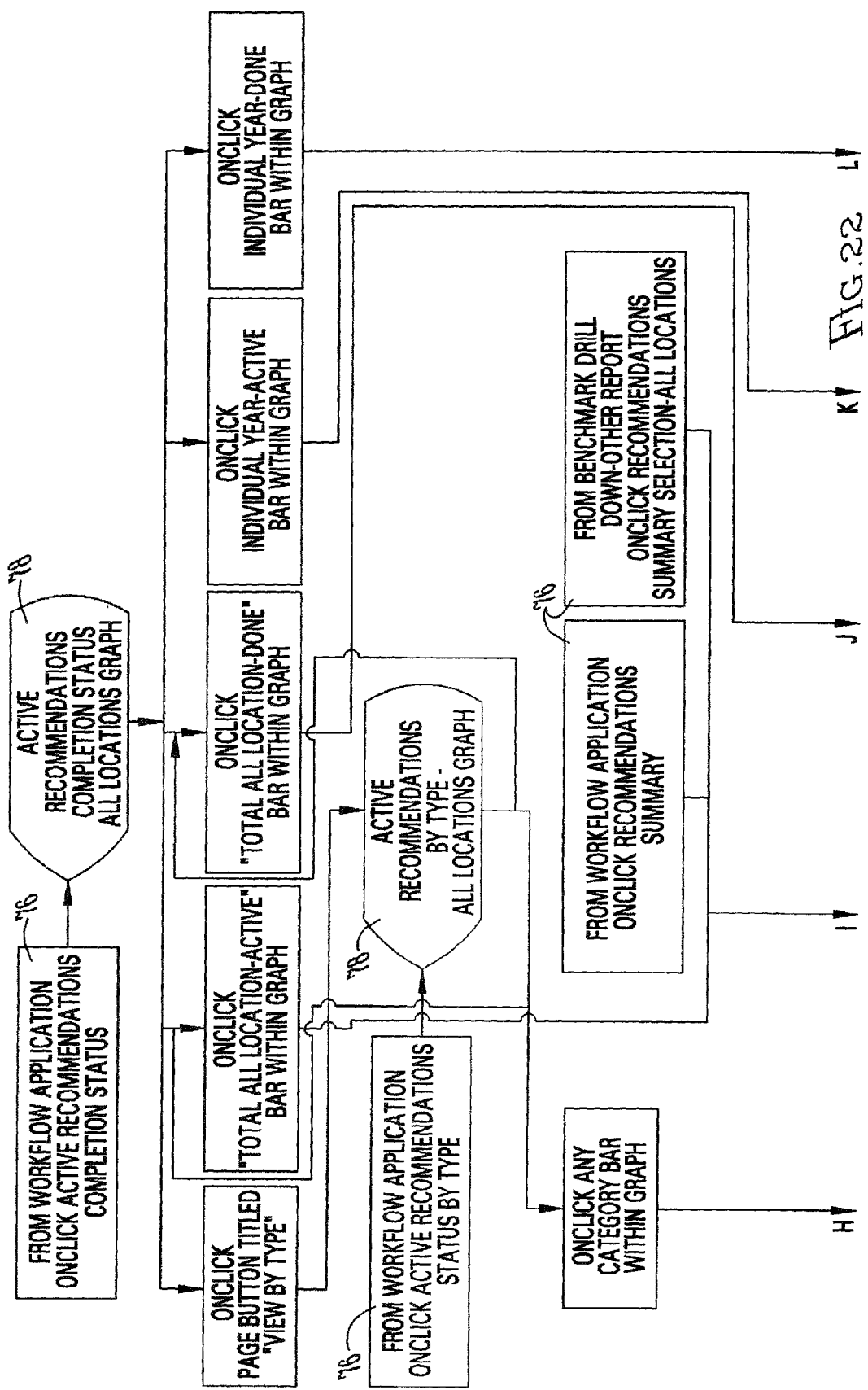
Figure 23:
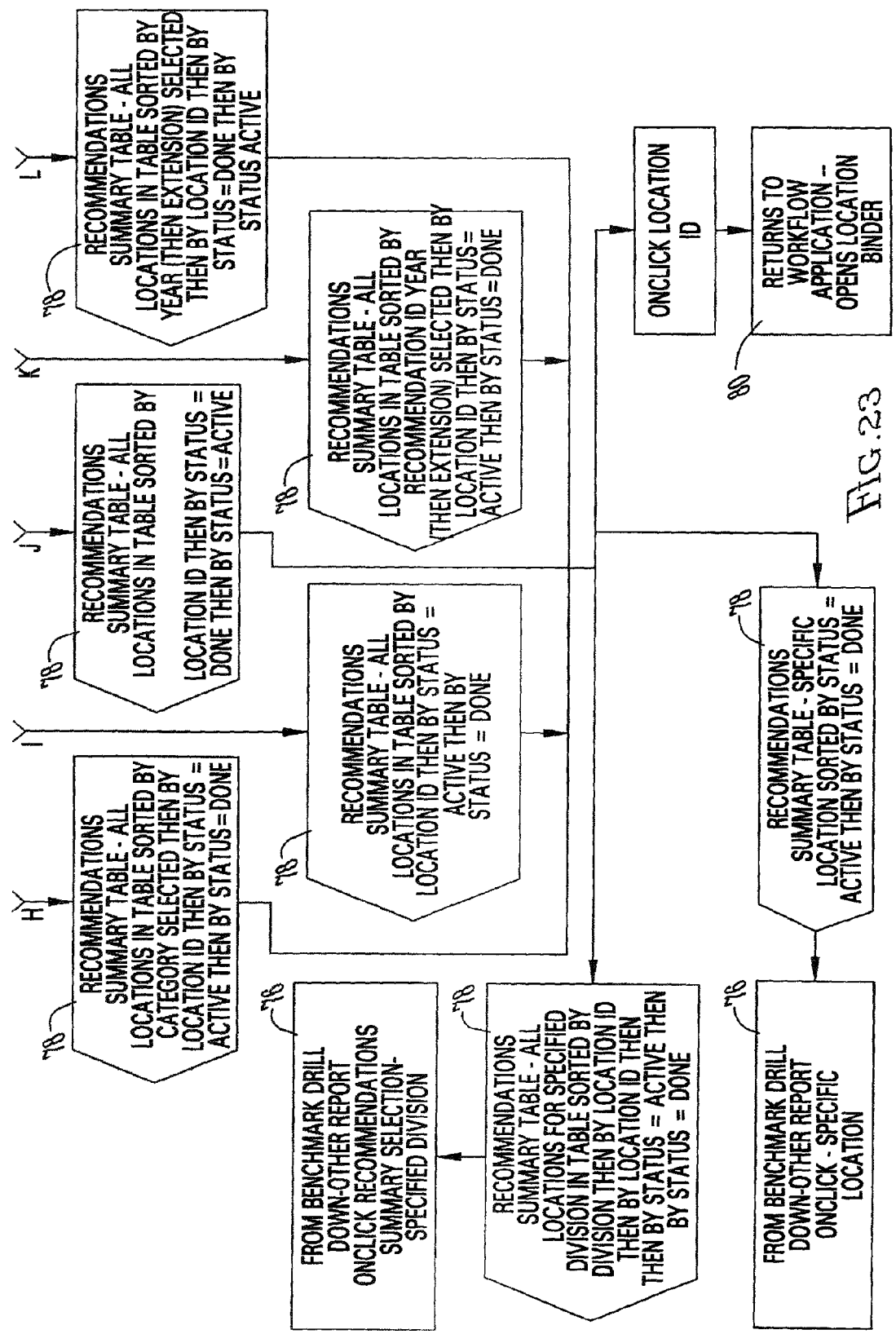

Data field 50E, FIG. 5E, is specifically used within FIGS. 22-23 for reporting recommendation summaries. The drill-down specifications within FIGS. 22-23 start at initiation points 76; the "onclick" annotation indicates user selection may be achieved through computer button clicks or menu selections relative to graphical user interfaces (e.g., at a computer 14, FIG. 1). Each decision point 78 provides singular or multiple lower-level drill-down options, as shown; preferably, designated sorting occurs in ascending order. Control transfer, terminal and new data query points 80 provide the as-shown capability.

Figure 24:
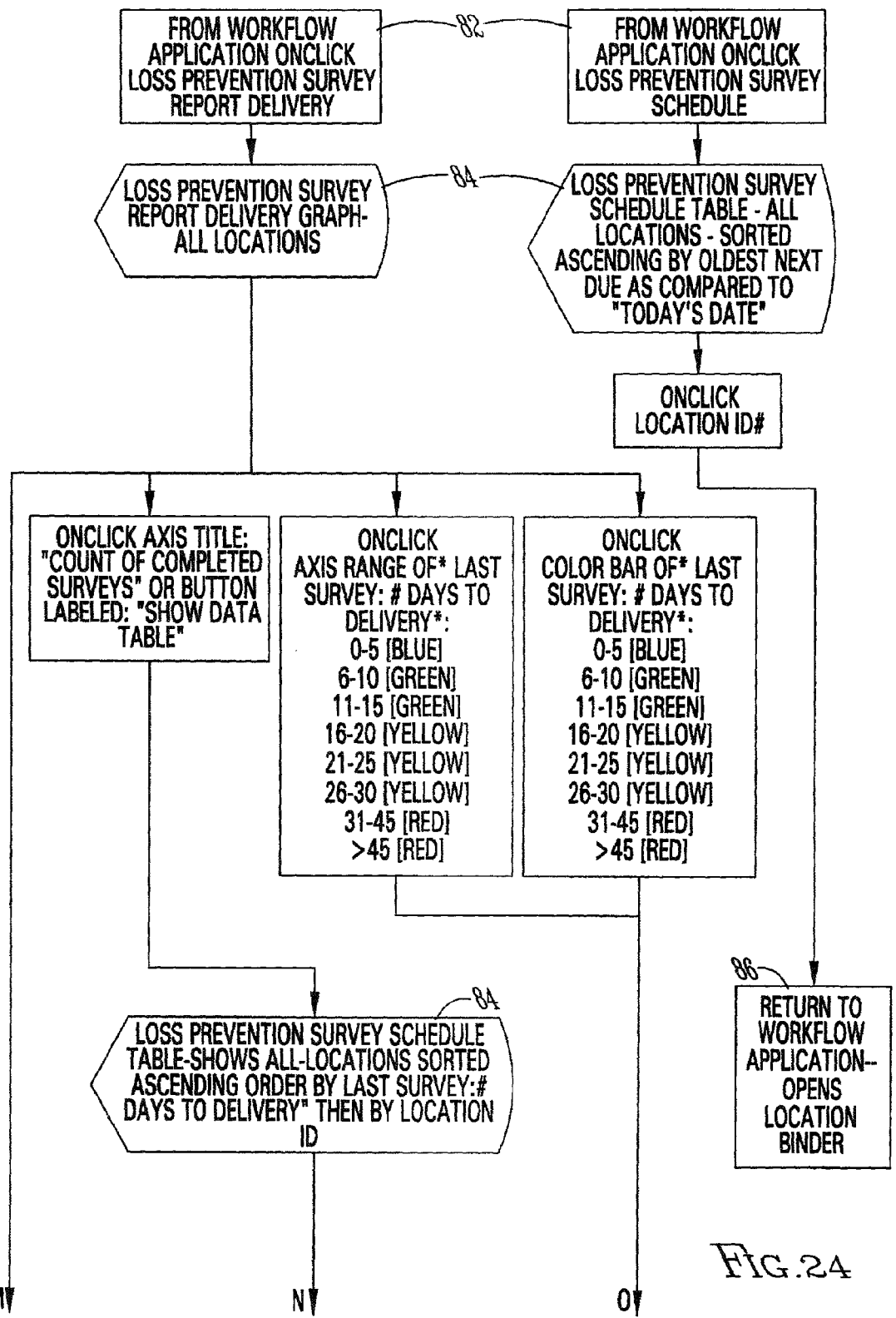
Figure 25:
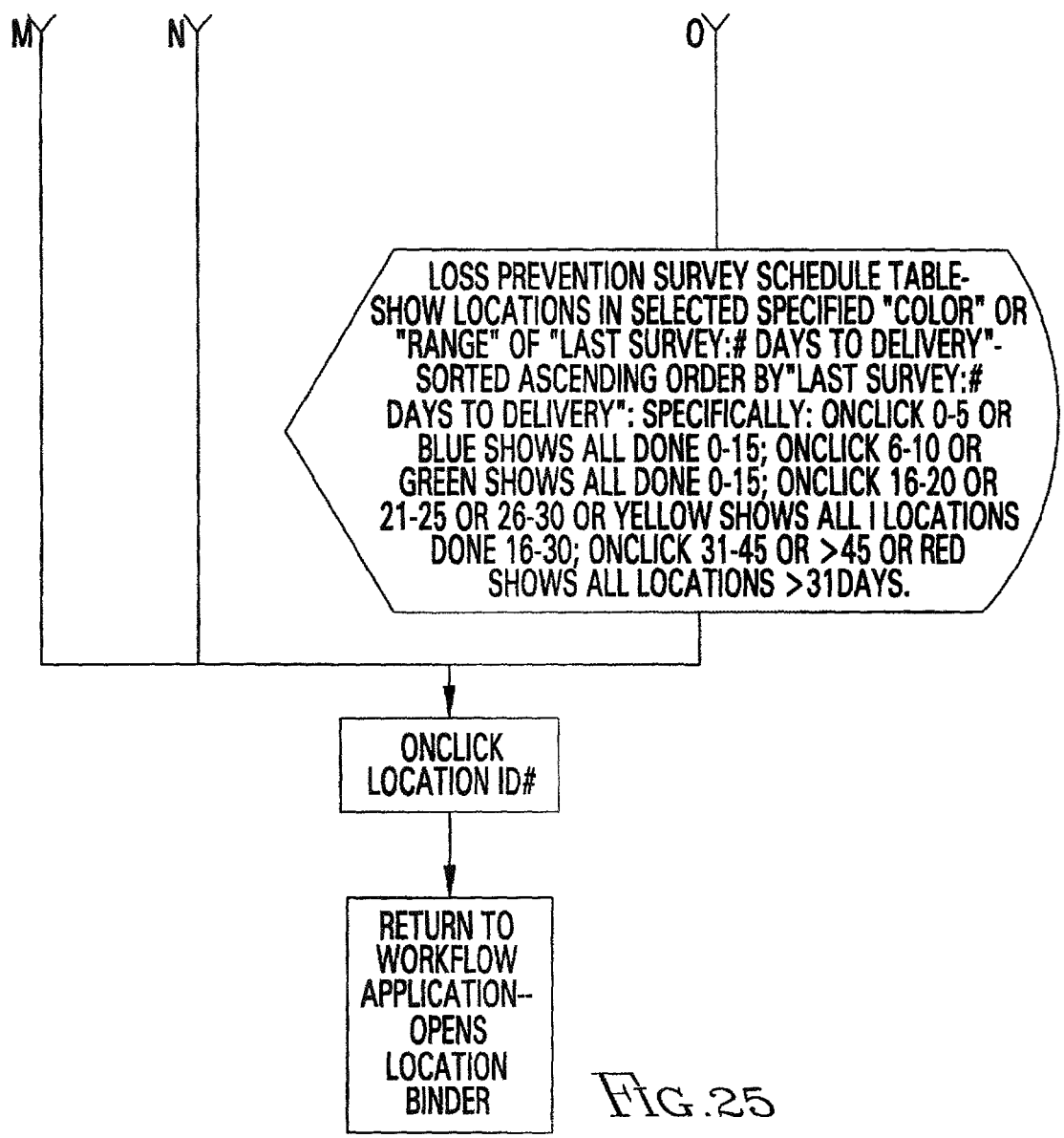

Data field 50F, FIG. 5F, is specifically used within FIGS. 24-25 for loss prevention delivery and schedule reporting. The drill-down specifications within FIGS. 24-25 start at initiation points 82; the "onclick" annotation indicates user selection may be achieved through computer button clicks or menu selections relative to graphical user interfaces (e.g., at a computer 14, FIG. 1). Each decision point 84 provides singular or multiple lower-level drill-down options, as shown. Control transfer, terminal and new data query points 86 provide the as-shown capability.

Figure 26:
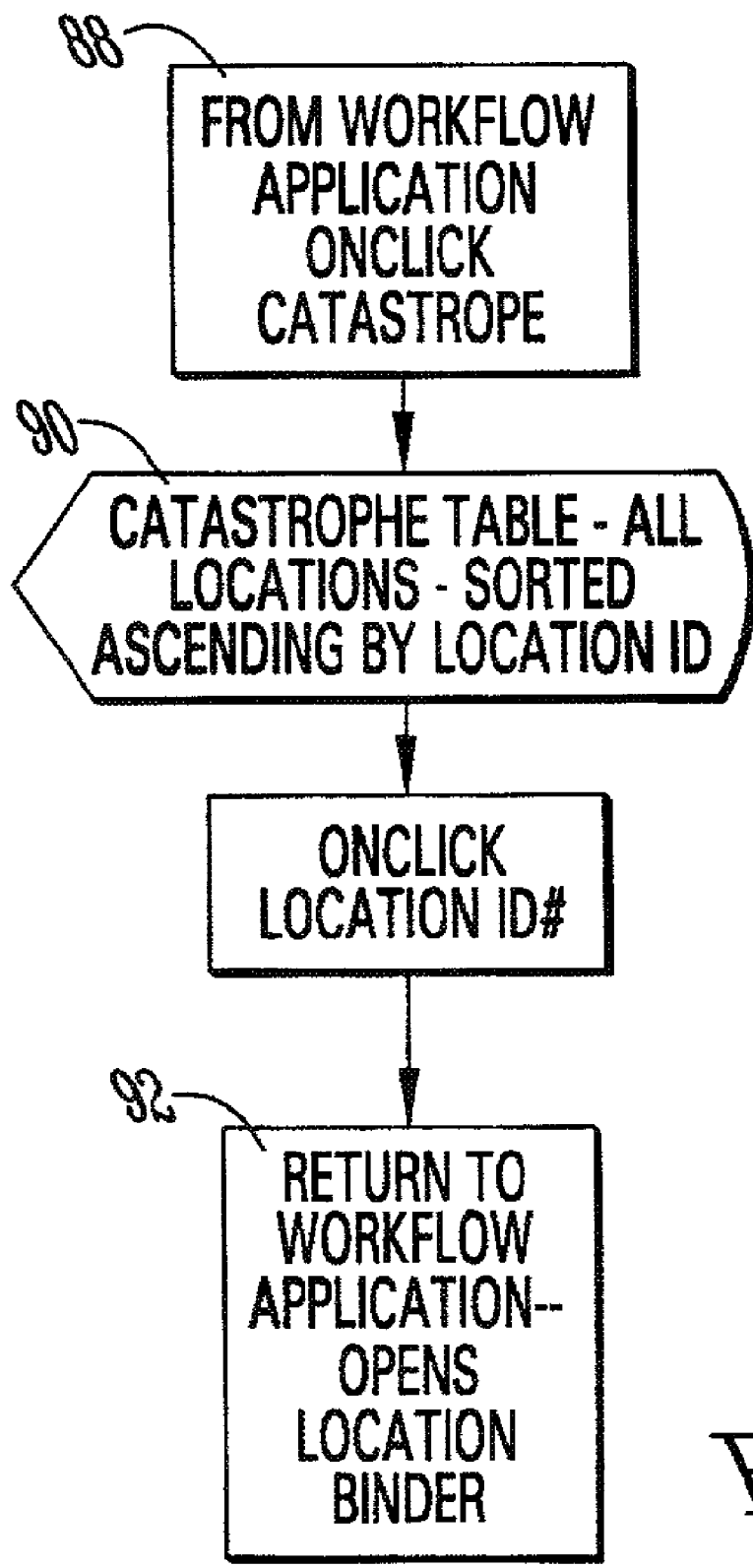

Data field 50G, FIG. 5G, is specifically used within FIG. 26 for catastrophe reporting. The drill-down specifications within FIG. 26 start at initiation point 88; the "onclick" annotation indicates user selection may be achieved through computer button clicks or menu selections relative to graphical user interfaces (e.g., at a computer 14, FIG. 1). Decision point 90 provides lower-level drill-down options, as shown. Control transfer, terminal and new data query point 92 provides the as-shown capability.

With further regard to FIG. 1, a user at an access computer 14 may also connect to workflow engine application 27 through an email server and network 200 by buses 201, 205, as shown. System 10 may thus include an email notification application 202 that that connects between buses 201, 205 to interface between (a) email server and network 200 and (b) database 20. In this way, email notification application 202 of system 10 may automatically send an email update to an authorized user, at an access computer 14, regarding modifications or newly-posted data to an associated risk management information segment 12(). The user may receive the e-mail message with links (e.g., descriptors and/or Internet hyperlinks) to an updated document and/or the file cabinet or binder in which the updated document is located.

The submission of new data for risk management information 12 through workflow process terminals 26 may also generate automated email message notifications. Specifically, upon receipt of the new data through a terminal 24(), application 202 may generate the email notification for a user at an access computer 14 through email server and network 200. The e-mail is automatically generated by email notification application 202 to notify users with appropriate access to the new data or document, as identified by database 20.

System 10 may further include a security buffer 204 that interfaces between network 18 and graphics interface 16, as shown between buses 203A, 203B. Buffer 204 verifies a user's access authority by comparing the user's identity with the authorization list associated with a particular risk information segment 12(). Accordingly, when a user clicks on an email link to updated information within database 20, buffer 204 may provide access security for the updated information.

Figure 27:
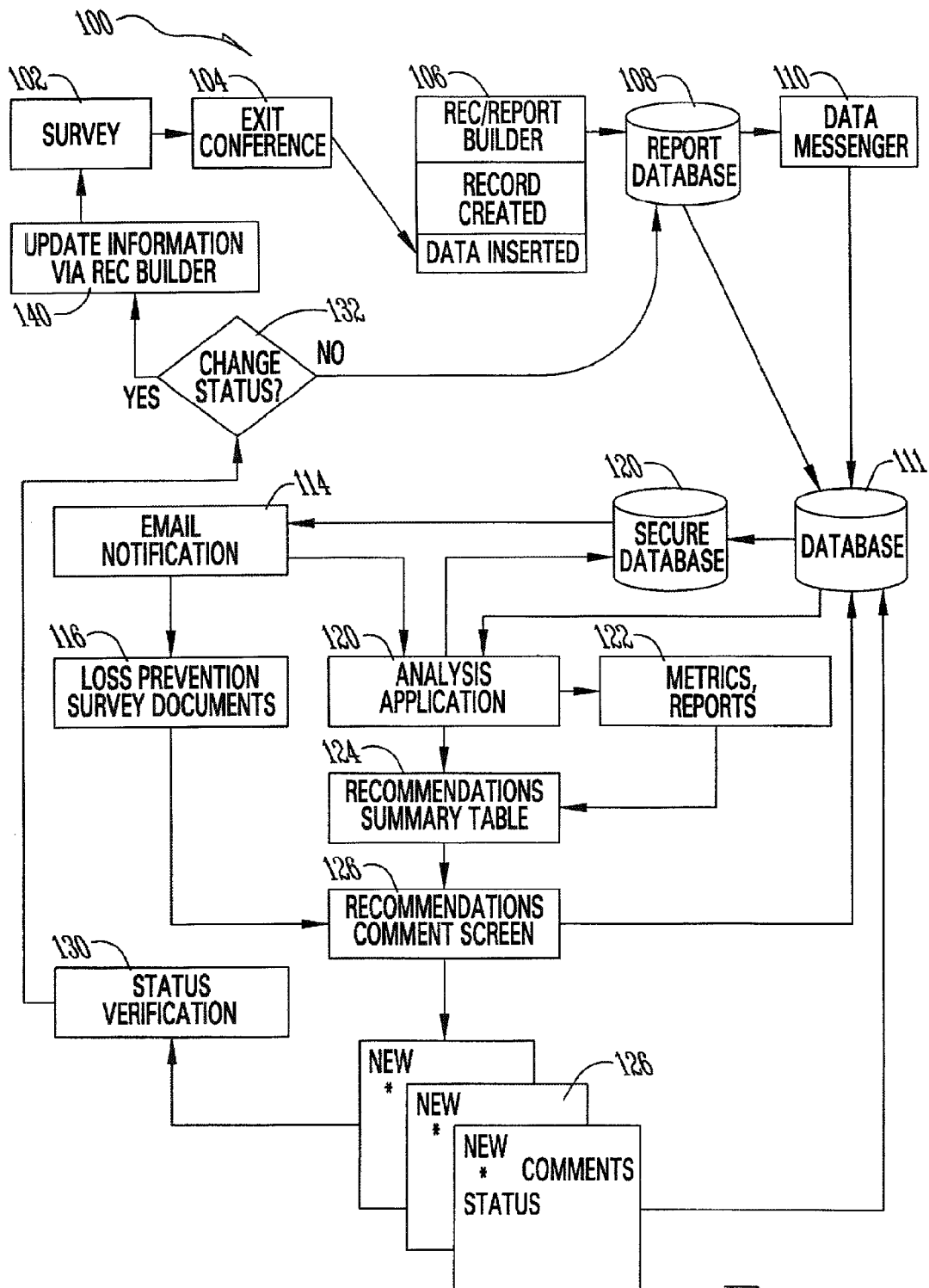
FIG. 27 shows a flowchart illustrating additional process operations of one risk management interface system of the invention.

FIG. 27 shows a flowchart 100 illustrating process operations and system elements of one risk management interface system of the invention. At survey 102, a remote field associate (e.g., an engineer) collects information to complete a risk evaluation from a customer's physical facility. By way of example, the associate may interact with system 10 via a terminal 24. At exit conference 104, the field associate consults with facility management to configure new commitments and recommendations resulting from survey 102. At step 106, reports and other records are created within system 10 for insertion to a relevant client data segments; a report is then compiled for a client access database 108. Step 106 may include a workflow application denoted as "rec builder" herein; rec builder may for example be used to create recommendations for specific surveys. Reports are sent to database 108 for direct update by messenger 110, an Internet e-mail software (client/server) application that segregates the report into data components for storage into interim database 111; database 111 stores data results of risk assessments in facility surveys 102.

A document may be posted to database 120 for a customer viewing on the World Wide Web; this also engages the e-mail notification 114, informing all authorized users who (a) have access to view that document and (b) have chosen to subscribe to e-mail notification that they have new information to view on the website. Preferably, the email provides a direct link 114 (e.g., a html link) to the newly posted information 116; information 116 may for example take the form of a loss prevention survey.

Link 114 may also provide access to secure database 120, which may for example take the form of database 20 and graphics interface 16, FIG. 1. Information from new surveys is automatically copied from database 111 to database 120.

Database 120 may for example be accessed through interactive interface 16 to generate metrics and reports 122 and a recommendations summary table 124 (i.e., a high-level list of all outstanding recommendations for the data set relevant to the current user query). Data 122, 124 may for example be displayed on a computer screen as graphic data 34', FIG. 1. From the recommendations summary screen, the user may 'click' on a specific line of data (e.g., a specific recommendation) and access the recommendation comments screen 126. Via comments screen 126, a user may read an archived history of comments made relative to specific recommendations (or sub-recommendations) and may also make comments, adjust status, change intent, set target dates, access full text of the recommendations, review high level cost-benefit analysis information, access standards and guidelines, engage the system to e-mail the full text of the recommendation(s), summary data and/or comment history (collectively the "data sets" 128). Changes to specific data sets 128, namely the comments, status, intent, target dates, etc., are ported directly back to database 111 for update and future access through messenger 110.

A new status is verified at status verification 130 by the remotely located field associate at the next survey 102. At step 132, if the user changes the status to "complete," the field associate verifies an appropriate completion, or rejects the completion and refreshes the status. If the recommendation is appropriately completed, the issue is closed and the status is "verified complete"—inactivating the recommendation, removing it from the queue, and reflecting appropriate completion on other data aggregation reports. If the recommendation is not completed according to proper guidelines, or according to user satisfaction, then the status is rejected and returned to a full active state with the field associate's comments appropriately logged. Information is updated via the rec builder at step 140 and at the completion of the next survey, whereinafter the cycle of FIG. 27 starts again.

Figure 28:
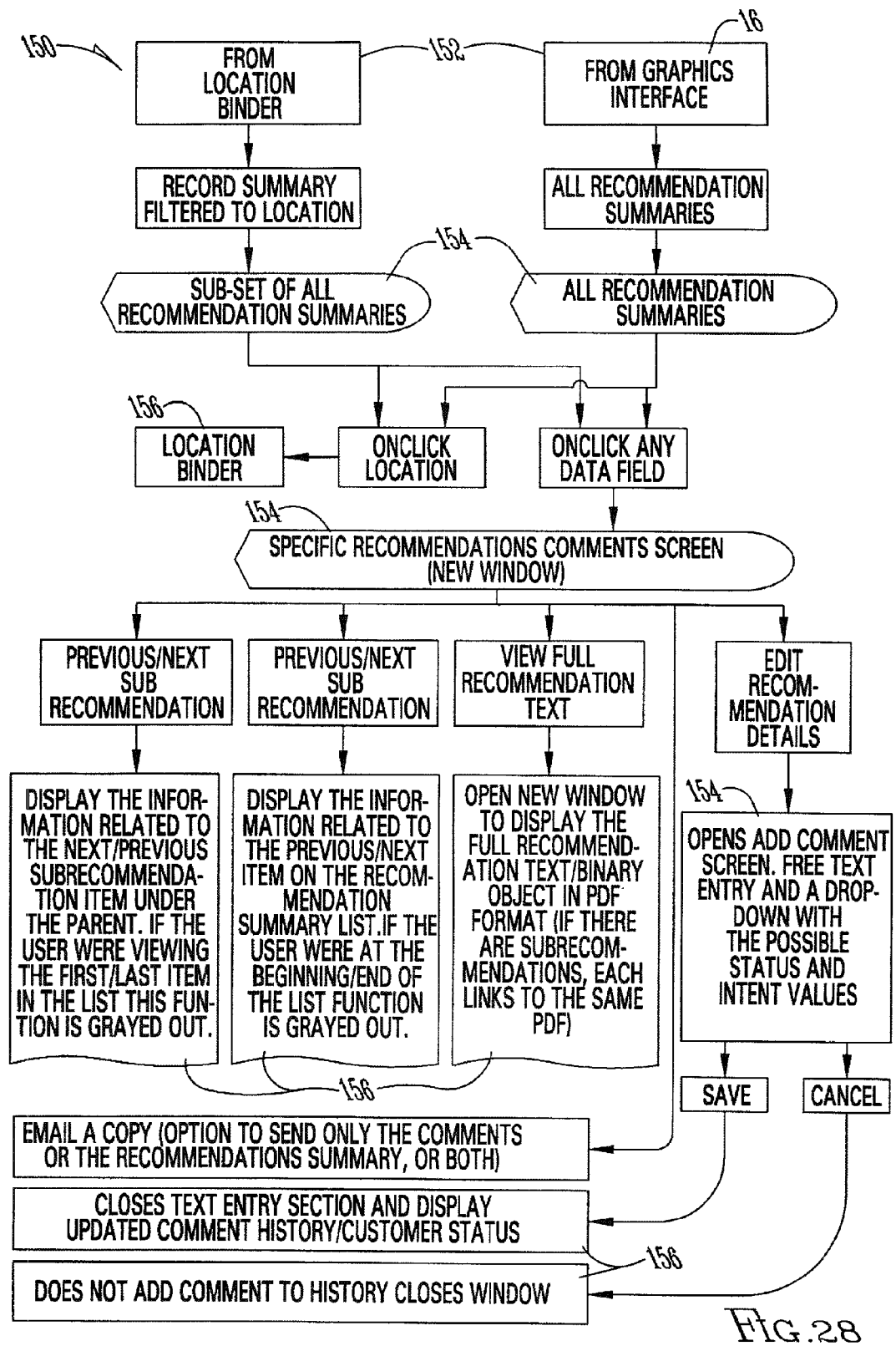
FIG. 28 shows a flowchart illustrating user access locations for interactive recommendations workflow in accord with one risk management interface system of the invention.

FIG. 28 shows a flowchart 150 illustrating user access locations for interactive recommendations workflow in accord with one risk management interface system of the invention. Flowchart 150 is similar to the flowchart of FIGS. 5-26 in providing drill-down specifications. The drill-down specifications within FIG. 28 start at initiation points 152: the location binder contains all like information for a particular location; "onclick" annotation indicates user selection may be achieved through computer button clicks or menu selections relative to graphical user interfaces (e.g., at a computer 14, FIG. 1). Each decision point 154 provides multiple lower-level drill-down options, as shown. Control transfer, terminal and new data query points 156 provide the as-shown capability.

Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A graphical and interactive interface system for managing risk management information, comprising:
   a secure database having risk management information accessible by authorized access through a network;
   a graphics interface for generating graphic data of the risk management information in response to the authorized access, the graphics interface further for providing drill-down linkage between high level summary and low level explanatory details based upon contributing factors to a risk quality rating, the contributing factors based on at least one recommendation associated with one of a plurality of facilities, the drill-down linkage enabling retrieval of lower-level interactive information; and
   means for generating email to alert authorized users to updates to the risk management information,
   wherein the risk management information is segmented within the database for association with a plurality of companies having proprietary interest in, and authorized access to, one or more segments of the risk management information, and wherein the risk management information pertains to property risks associated with loss of existing property associated with a plurality of entities located at a plurality of respective facilities.

2. A system of claim 1, the authorized access comprising user inputs to the graphics interface regarding risk management information.

3. A system of claim 1, further comprising one or more workflow process terminals connected in network with the database, for providing updates to the risk management information.

4. A system of claim 3, the terminals comprising a computer.

5. A system of claim 3, the terminals comprising one or more of a facsimile, telephone and scanner.

6. A system of claim 1, the database further comprising assistance data accessible concurrently with authorized access of the risk management information.

7. A system of claim 6, the assistance data comprising loss prevention and control standards and guidelines.

8. A system of claim 1, a first portion of the risk management information being associated with a first company having proprietary interest in the first portion, a second portion of the risk management information being associated with a second company having proprietary interest in the second portion, the database and interface cooperating to provide access by the first company to the first portion by authorized access while prohibiting access by the second company to the first portion, the database and interface cooperating to provide access by the second company to the second portion by authorized access while prohibiting access by the first company to the second portion.

9. A system of claim 1, wherein at least part of the risk management information is encrypted to facilitate the authorized access, and further comprising one or more access computers coupled in network with the graphics interface for accessing the risk management information of the database, each of the computers enabling decryption of the encrypted risk management information with input of appropriate access codes.

10. A system of claim 1, further comprising first and second computers coupled in network with the graphics interface, the interface providing the first computer with access to a portion of the risk management information and restricting the second computer from access to the portion.

11. A system of claim 1, the graphics interface providing one or more filter functions to manipulate the risk management information for display of graphic data at a computer networked with the graphics interface.

12. A system of claim 11, the filter functions comprising one or more of the following: country, city, state, location identifier, gross site property damage values, property value, total location in square feet, percent noncombustible construction, percent of noncombustible walls and roof deck with combustible roof covering, percent of combustible roof, percent of combustible walls, percent with sprinklers, percent needing sprinklers, survey report delivery time, estimated annual risk avoidance, cost to complete, last survey date, next survey year/month due, ATC earthquake zone, sprinkler protection, water supply, surveillance, warehousing protection, other protection, management programs, impairments, smoking regulations, maintenance, employee training, new construction, insurance, pre-emergency planning, private fire brigade, hazardous materials, hot work, loss prevention inspection, fire protection inspection, hazard evaluation, housekeeping, outside contractors, FEMA flood zones, windstorm, fire department type, survey frequency, priority, status, customer intent to complete, and predominant construction.

13. A system of claim 11, the graphic data comprising one or more reports selected from the group consisting of fire protection, recommendation summary, loss prevention survey report delivery, loss prevention survey report schedule, risk quality benchmarking, risk quality rating, management programs, building construction, catastrophe, active recommendations, and completion status.

14. A system of claim 1, the means for generating email generates email in response to receipt of an update to the risk management information.

15. A system of claim 14, the means for generating email generates email only for authorized user inputs to the risk management information.

16. A system of claim 14, the email being addressed to a user having the authorized access to the risk management information.

17. A system of claim 14, the email having a hyperlink to graphic data of the risk management information.

18. A system of claim 1, the means for generating email generates periodic email defining updates to the risk management information.

19. A system of claim 18, the periodic email being addressed to a user having the authorized access to the risk management information.

20. A system of claim 18, the periodic email having a hyperlink to graphic data of the risk management information.

21. A system of claim 1, the database being responsive to inputs by a user with authorized access at a computer networked with the database to securely store electronic documents with the risk management information associated with the user.

22. A system of claim 21, the electronic documents comprising one or more of loss prevention survey results, risk summaries, and computer aided diagrams (CAD) diagrams.

23. A system of claim 21, the electronic documents comprising one or more computer aided diagrams (CAD) diagrams, and further comprising means for automatically converting the CAD diagrams into a graphic image for storage within the database.

24. A system of claim 1, the database comprising a SQL database server.

25. A system of claim 1, the database responsive to electronically received recommendations regarding a segment of risk management information to post the recommendations with the segment of risk management information.

26. A system of claim 1, the graphics interface facilitating interactive recommendations, wherein electronic recommendations for a segment of risk management information may be stored with the database for association with the segment of risk management information.

27. A system of claim 1, further comprising means for appending user-generated comments to one or more segments of the risk management information.

28. A system of claim 1, further comprising means for viewing and manipulating recommendations and associated valuations through the graphics interface and over the network.

29. A system of claim 28, further comprising means for selectively switching between cost-benefit analyses, summaries, and status screens, through the graphics interface and over the network.

30. A system of claim 28, further comprising means for selectively switching between values associated with recommendations, through the graphics interface and over the network.

31. A system of claim 1, further comprising means for viewing one or more of the following recommended cost-benefit analysis information through the graphics interface and over the network: total loss before implementation of a recommendation, total loss after implementation of a recommendation, property damage loss before implementation of a recommendation, property damage loss after implementation of a recommendation, business interruption loss before implementation of a recommendation, business interruption loss after implementation of a recommendation, estimated cost to complete, estimated cost to complete source, estimated probability, estimated probability source, and estimated annual risk avoidance.

32. A system of claim 1, further comprising means for sharing one or more recommendations between users through the interface and over the network.

33. A system of claim 32, the sharing based upon access and authority levels of accounts, divisions, locations, or individuals.

34. A system of claim 1, further comprising means for automatically emailing users with notification of modifications in a segment of risk management information, the users having authorized access to the segment.

35. A system of claim 1, wherein the means for generating email comprising (a) an email server connected in network with one or more access computers, and (b) an email notification application connected in network with the database for automatically sending email notification to the access computers upon updates to the risk management information.

36. A system of claim 35, further comprising a workflow engine application connected in network between the database and the email notification application, for interfacing between one or more access terminals and the database.

37. A system of claim 1, further comprising a workflow engine application connected in network with the database for interfacing between one or more access terminals and the database.

38. A system of claim 37, the workflow engine application comprising a workflow application for posting recommendations to the risk management information.

* * * * *